United States Patent
Goossens et al.

(10) Patent No.: US 11,384,802 B2
(45) Date of Patent: *Jul. 12, 2022

(54) METHOD FOR CLUTCH KISS POINT CHARACTERIZATION

(71) Applicant: Dana Automotive Systems Group, LLC, Maumee, OH (US)

(72) Inventors: Stijn Goossens, Erpe-Mere (BE); Ben Goyens, Zoersel (BE)

(73) Assignee: Dana Automotive Systems Group, LLC, Maumee, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/171,580

(22) Filed: Feb. 9, 2021

(65) Prior Publication Data

US 2021/0199163 A1   Jul. 1, 2021

Related U.S. Application Data

(63) Continuation of application No. 16/471,427, filed as application No. PCT/US2017/067916 on Dec. 21, 2017, now Pat. No. 10,948,033.

(Continued)

(51) Int. Cl.
    *F16D 48/06*     (2006.01)
    *F16D 125/36*    (2012.01)

(52) U.S. Cl.
    CPC ........ *F16D 48/064* (2013.01); *F16D 2125/36* (2013.01); *F16D 2300/18* (2013.01);
    (Continued)

(58) Field of Classification Search
    CPC .... F16D 48/06; F16D 48/064; F16D 2300/18; F16D 2500/10406; F16D 2500/3022;
    (Continued)

(56) References Cited

U.S. PATENT DOCUMENTS

| | | |
|---|---|---|
| 5,393,274 A | 2/1995 | Smedley |
| 6,692,396 B1 * | 2/2004 | Grogg ............... F16H 48/08 137/539 |

(Continued)

FOREIGN PATENT DOCUMENTS

| | | |
|---|---|---|
| DE | 102012220758 A1 | 6/2013 |
| EP | 2192319 A1 | 6/2010 |

OTHER PUBLICATIONS

ISA European Patent Office, International Search Report Issued in Application No. PCT/US2017/067916, dated May 15, 2018, WIPO, 15 pages.

*Primary Examiner* — Edwin A Young
(74) *Attorney, Agent, or Firm* — McCoy Russell LLP

(57) ABSTRACT

A method for determining a kiss point is disclosed. A drive unit having one or more motors with a motor output shaft is provided. One or more actuation profiles are ran and an amount of motor current and motor shaft position data is measured. The data measured is filtered and one or more motor current vs. motor shaft position plots having one or more curves with a high force and high current region are generated. A derivative is calculated over the curves and a slope of the high force and high current region is determined. A relative slope threshold is determined by multiplying the slopes by a predetermined percentage. One or more lines having a slope substantially equal to the relative slope threshold are plotted. The kiss point is determined based on the position of the motor shaft where the derivative of the curves equals the slope of the lines plotted.

20 Claims, 8 Drawing Sheets

Related U.S. Application Data

(60) Provisional application No. 62/437,344, filed on Dec. 21, 2016.

(52) U.S. Cl.
CPC .............. *F16D 2500/10406* (2013.01); *F16D 2500/3022* (2013.01); *F16D 2500/3026* (2013.01); *F16D 2500/3042* (2013.01); *F16D 2500/50251* (2013.01); *F16D 2500/7041* (2013.01); *F16D 2500/70668* (2013.01)

(58) Field of Classification Search
CPC ..... F16D 2500/3026; F16D 2500/3042; F16D 2500/50251; F16D 2500/7041; F16D 2500/70668; F16D 2500/102; F16D 2500/1021; F16D 2500/1023; F16D 2500/5012; F16D 2500/5018; F16D 2500/50233; F16D 2500/706; F16D 2500/70621; F16D 2500/7082; F16D 2500/50245; F16D 2500/50266
See application file for complete search history.

(56) References Cited

U.S. PATENT DOCUMENTS

| | | | |
|---|---|---|---|
| 7,258,648 | B2 | 8/2007 | Smith et al. |
| 7,974,758 | B2 | 7/2011 | Kiessner-Haiden |
| 8,515,640 | B2 | 8/2013 | Monti et al. |
| 8,738,256 | B2 | 5/2014 | Connolly et al. |
| 9,562,576 | B2 | 2/2017 | Hodrus |
| 10,948,033 | B2 * | 3/2021 | Goossens ................ F16D 48/06 |
| 2004/0238311 | A1 | 12/2004 | Parigger |
| 2005/0026733 | A1 * | 2/2005 | Yoshioka ................ F16H 48/30 475/231 |
| 2005/0130800 | A1 | 6/2005 | Rieger et al. |
| 2010/0185374 | A1 | 7/2010 | Desfriches et al. |
| 2012/0298466 | A1 | 11/2012 | Nedachi et al. |
| 2015/0051803 | A1 | 2/2015 | Tao et al. |
| 2016/0084327 | A1 | 3/2016 | Toon et al. |
| 2016/0167659 | A1 | 6/2016 | Gibson et al. |

* cited by examiner

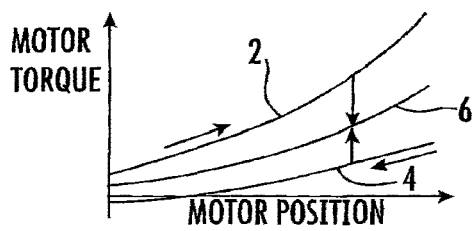

$$\text{CLAMPING } T(\theta)_{em\ clamp} = C_{geom} \cdot F(\theta)\ clutch + J\frac{d^2\theta_{clamp}}{dt^2} + T_{fric}(F\ clutch)$$

$$\text{RELEASING } T(\theta)_{em\ clamp} = C_{geom} \cdot F(\theta)\ clutch + J\frac{d^2\theta_{release}}{dt^2} + T_{fric}(F_{release})$$

$$\frac{T(\theta)em\ clamp + T(\theta)em\ release}{2} = C_{geom}\ F(\theta)_{clutch}$$

**FIG. 1
(PRIOR ART)**

$$C_{geom}\ F(\theta)\ clutch = \frac{T(\theta)em\ clamp + T(\theta)em\ release}{2}$$

$$F(\theta)_{clutch} = \frac{K_t \cdot I_{clamp}(\theta) + K_t \cdot I_{release}(\theta)}{2 \cdot C_{geom}}$$

**FIG. 2
(PRIOR ART)**

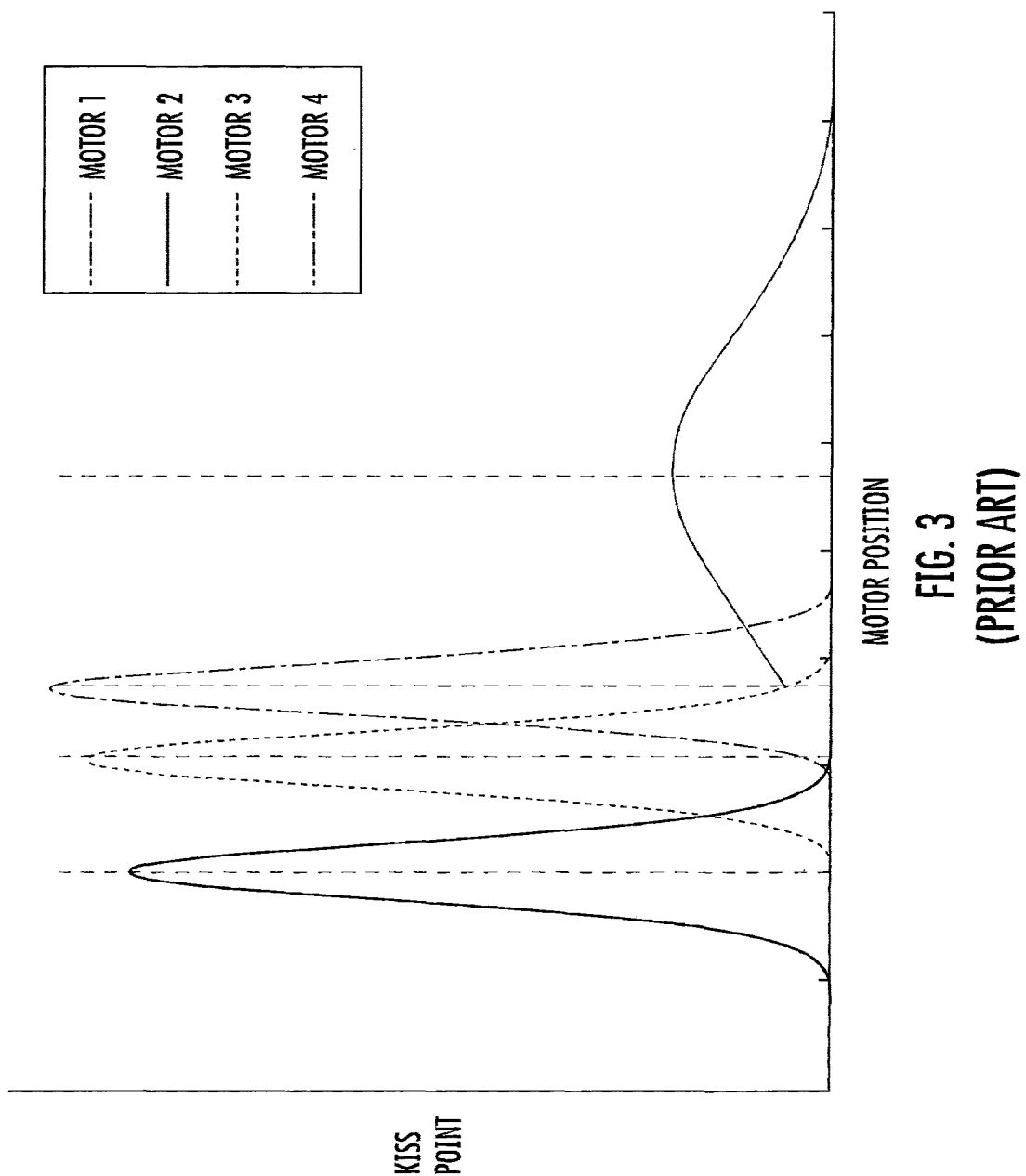

METHOD FOR CLUTCH KISS POINT CHARACTERIZATION

CROSS-REFERENCE TO RELATED APPLICATIONS

The present application is a continuation of U.S. patent application Ser. No. 16/471,427, entitled "A METHOD FOR CLUTCH KISS POINT CHARACTERIZATION", and filed on Jun. 19, 2019. U.S. patent application Ser. No. 16/471,427 is a national phase of International Application No. PCT/US2017/067916, entitled "A METHOD FOR CLUTCH KISS POINT CHARACTERIZATION", and filed on Dec. 21, 2017. International Application No. PCT/US2017/067916 claims priority to U.S. Provisional Patent Application No. 62/437,344, entitled "A ROBUST METHOD FOR CLUTCH KISS POINT CHARACTERIZATION", and filed on Dec. 21, 2016. The entire contents of each of the above-listed applications is hereby incorporated by reference for all purposes.

TECHNICAL FIELD

The present disclosure relates to a method for characterizing the kiss point of a clutching assembly used in a vehicle.

BACKGROUND

Various methods of characterizing a reference position or kiss point for a clutching or a clutch pack assembly are known in the art. Typically, vehicle clutch pack assemblies are found in a vehicle drive unit, such as but not limited to, a front drive unit, rear drive unit, a forward tandem axle drive unit and/or a rear tandem axle drive unit of a vehicle. The clutch pack assembly precisely controls the amount of torque that is transferred by an engine to the wheel(s) of the vehicle by applying of an amount of force onto a plurality of clutch plates. In conventional clutch pack assemblies, a first portion of the plurality of clutch plates are drivingly connected to an axle half shaft and a second portion of the plurality of clutch plates are drivingly connected to a side gear of a differential assembly within the drive unit of the vehicle.

FIGS. 1-3 of the disclosure illustrate a conventional method of characterizing the reference position or kiss point of a clutch pack assembly. The conventional methods of characterizing the reference position or kiss point of the clutch pack assembly utilize the torque of the motor in order to identify a relationship between the clutch force and the position of the motor. As it can be seen by referencing FIGS. 1 and 2 of the disclosure, the motor torque versus motor position plot includes a clamping clutch pack curve 2 and a releasing clutch pack curve 4 in order to determine a reference position or kiss point curve 6. The accuracy of this method of estimating the amount of clutch force being applied to the plurality of clutch plates of the clutch pack is dependent on. (i) the differences in the clutching or clutch pack assemblies in terms of their geometry and mechanical tolerances ($C_{geom}$), (ii) the performance variations between the motors used in terms of the amount of torque available for a given applied current ($k_t$), and (iii) the tolerances of the control unit to measure the amount of current supplied to the motor ($I_{clamp}$ & $I_{release}$).

Along with the relationship between the clutch force and the position of the motor, a reference position needs to be determined for controller purposes. Typically, the reference position characterized in the clutch pack assembly is referred to as the kiss point. The kiss point is the point at which the motor begins to apply an amount of force onto the plurality of clutch plates of the clutch pack. The conventional method of determining the kiss point requires a detecting and determining when the slope of the measured clamping curve exceeds a certain absolute value. When using the same vehicle drive unit hardware, one would expect to see the same clutch force estimation and kiss point for different motors and control units. However, as illustrated in FIG. 3 of the disclosure, the plot graphically illustrates that the use of different motors within the same drive unit provides a different kiss point and a different motor position to achieve that kiss point. It would therefore be advantageous to develop a more robust method of identifying, characterizing and estimating a reference position for a motor of a drive unit that is independent of the variations found in the motors, the control units and other serviceable components used within a clutch pack assembly.

SUMMARY

A method is disclosed for determining a kiss point. A drive unit having one or more clutch pack assemblies, one or more motors with a motor output shaft and a one or more force translational devices is provided. One or more actuation profiles are ran. During the one or more actuation profiles ran, an amount of motor current used and a motor output shaft position is measured. The motor current and motor output shaft position data measured is filtered and one or more motor current versus (vs.) motor shaft position plots having one or more curves with a high force and high current region are generated. Once the one or more curves have been generated and plotted, a derivative is calculated over the one or more curves and one or more slopes of the high force and high current region is determined. A relative slope threshold is determined by multiplying the one or more slopes of the high force and high current region of the one or more curves by a predetermined percentage. One or more lines having a slope that is substantially equal to the relative slope threshold are plotted on the one or more motor current vs. motor shaft position plots generated. The kiss point for the one or more motors is determined based on the position of the motor output shaft where the derivative of the one or more curves equals the slope of the one or more lines plotted.

BRIEF DESCRIPTION OF THE FIGURES

The above, as well as other advantages of the present disclosure, will become readily apparent to those skilled in the art from the following detailed description when considered in light of the accompanying drawings in which:

FIG. 1 is a graphical representation and an equation describing a conventional method of characterizing a reference position for a clutch pack assembly of a vehicle;

FIG. 2 is an equation describing the conventional method of determining the relationship between the clutching force and the position of the motor illustrated in FIG. 1 rewritten;

FIG. 3 is a graphical representation illustrating how the reference position changes with different motors when using the conventional method of characterizing a clutch pack assembly;

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

The present disclosure relates to a robust method for characterizing or determining a reference position or kiss point of a clutching or clutch pack assembly used in a vehicle drive unit. As a non-limiting example, the method described herein may be used in combination with a drive unit, such as but not limited to, a front drive unit, a rear drive unit, a forward tandem axle drive unit, a rear tandem axle drive unit, a differential assembly and/or any other vehicle drive unit having one or more clutching or clutch pack assemblies.

It is within the scope of this disclosure, and as a non-limiting example, that the method for characterizing or determining the reference position or kiss point of a clutch pack assembly described herein may be used in automotive, off-road vehicle, all-terrain vehicle, construction, structural, marine, aerospace, locomotive, military, machinery, robotic and/or consumer product applications. Additionally, as a non-limiting example, the method described herein may also be used in passenger vehicle, electric vehicle, hybrid vehicle, commercial vehicle, autonomous vehicles, semi-autonomous vehicles and/or heavy vehicle applications.

Figure 4:
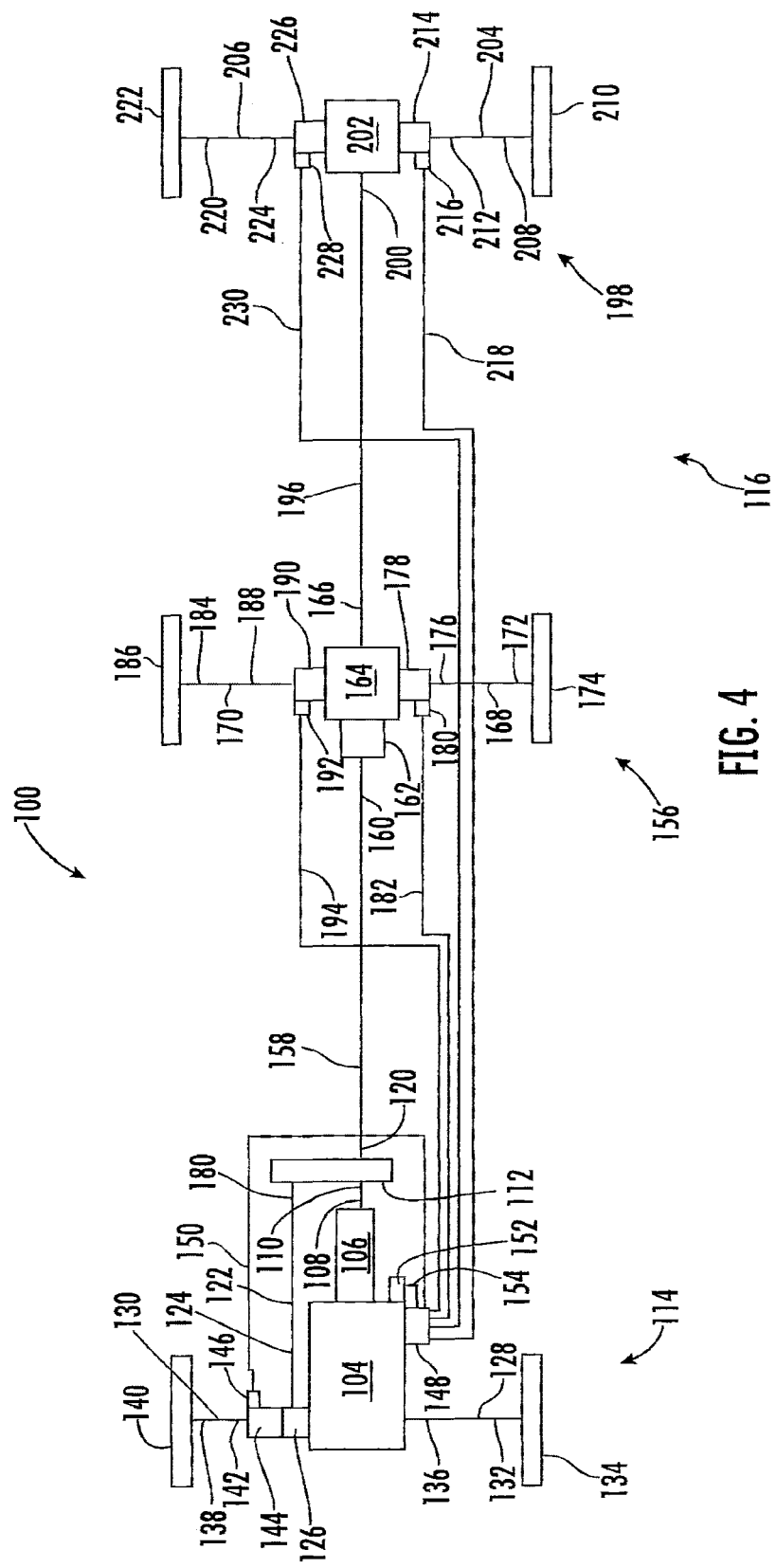
FIG. 4 is a schematic top-plan view of a vehicle having one or more drive units with a clutch pack assembly where the kiss point is characterized according to an embodiment of the disclosure.

FIG. 4 is a schematic top-plan view of a vehicle 100 having one or more clutching or clutch pack assemblies where the kiss point is characterized according to an embodiment of the disclosure. As illustrated in FIG. 4 of the disclosure and as a non-limiting example, the vehicle 100 has an engine 104 which is drivingly connected to a transmission 106. As non-limiting example, the engine 104 of the vehicle 100 may be an internal combustion engine, an electric motor, a steam turbine and/or a gas turbine. A transmission output shaft 108 is then drivingly connected to an end of the transmission 106 opposite the engine 104. The transmission 106 is a power management system which provides controlled application of the rotational power generated by the engine 104 by means of a gear box.

Drivingly connected to an end of the transmission output shaft 108, opposite the transmission 106, is a transfer case input shaft 110. An end of the transfer case input shaft 110, opposite the transmission output shaft 108, is drivingly connected to at least a portion of a transfer case 112 of the vehicle 100. The transfer case 112 of the vehicle 100 allows for the selective transfer the rotational power from the transmission 106 to a front axle system 114 and a tandem axle system 116 of the vehicle 100 by utilizing a series of gears and drive shafts. As illustrated in FIG. 4 of the disclosure and as a non-limiting example, the transfer case 112 includes a first transfer case output shaft 118 and a second transfer case output shaft 120.

A first shaft 122 extends from the first transfer case output shaft 118 toward the front axle system 114 of the vehicle 100. The first shaft 122 transmits the rotational power from the transfer case 112 to the front axle system 114 of the vehicle 100 thereby drivingly connecting the transfer case 112 to the front axle system 114. It is within the scope of this disclosure and as a non-limiting example that the first shaft 122 may be a drive shaft, a propeller shaft, a Cardan shaft or a double Cardan shaft.

Drivingly connected to an end of the first shaft 122, opposite the first transfer case output shaft 118, is a front axle system input shaft 124. The front axle system input shaft 124 drivingly connects the first shaft 122 to a front axle differential assembly 126 of the front axle system 114 of the vehicle 100. As illustrated in FIG. 4 of the disclosure and as a non-limiting example, at least a portion of an end of the front axle system input shaft 124, opposite the first shaft 122, is drivingly connected to the front axle differential assembly 126. It is within the scope of this disclosure and as a non-limiting example that the front axle system input shaft 124 may be front differential input shaft, a coupling shaft, stub shaft or a front differential pinion shaft. The front axle differential assembly 126 is a set of gears that allows the outer drive wheel(s) of the vehicle 100 to rotate at a faster rate that the inner drive wheel(s). The rotational power is transmitted through the front axle system 114 as described in more detail below.

The front axle system 114 further includes a first front axle half shaft 128 and a second front axle half shaft 130. As illustrated in FIG. 4 of the disclosure and as a non-limiting example, the first front axle half shaft 128 extends substantially perpendicular to the front axle system input shaft 124 of the vehicle 100. At least a portion of a first end portion 132 of the first front axle half shaft 128 is drivingly connected to a first front axle wheel assembly 134 and at least a portion of a second end portion 136 of the first front axle half shaft 128 is drivingly connected to an end of the front axle differential assembly 126. It is within the scope of this disclosure and as a non-limiting example that the second end portion 136j of the first front axle half shaft 128 may be drivingly connected to a front differential side gear, a separate stub shaft, a separate coupling shaft, a first front axle differential output shaft, a first front axle have shaft connect and disconnect assembly and/or a shaft that is formed as part of a front differential side gear.

Extending substantially perpendicular to the front axle system input shaft 124 is the second front axle half shaft 130 of the vehicle 100. At least a portion of a first end portion 138 of the second front axle half shaft 130 is drivingly connected to a second front axle wheel assembly 140 of the vehicle 100. As illustrated in FIG. 4 of the disclosure and as a non-limiting example, at least a portion of a second end portion 142 of the second front axle half shaft 130 is drivingly connected to an end of the front axle differential assembly 126 opposite the first front axle half shaft 128. It is within the scope of this disclosure and as a non-limiting example that the second end portion 142 of the second front axle half shaft 130 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

According to the embodiment of the disclosure illustrated in FIG. 4 and as a non-limiting example, the front axle system 114 of the vehicle 100 may further include the use of one or more front axle differential clutch pack assemblies 144. The one or more front axle differential clutch pack assemblies 144 are used to precisely control the amount of torque that is transferred by the engine 104 to the first and/or second front axle wheel assemblies 134 and/or 140 of the vehicle 100. In order to apply an amount of force onto the one or more front axle differential clutch pack assemblies 144, a first motor 146 is operably connected to at least a portion of the one or more front axle differential clutch pack assemblies 144 of the vehicle 100. It is within the scope of this disclosure and as a non-limiting example that the first motor 146 of the one or more front axle differential clutch pack assemblies 144 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The first motor 146 of the one or more front axle differential clutch pack assemblies 144 is then in communication with a control unit 148 via one or more first motor data-links 150. The one or more first motor data-links 150 allow for communication between the first motor 146 and the control unit 148 of the vehicle 100. As a non-limiting example, the one or more first motor data-links 150 of the vehicle 100 may be one or more fiber optic cables and/or one or more electrical cables that put the control unit 148 in optical and/or electrical communication with the first motor 146 of the one or more front axle differential clutch pack assemblies 144.

In accordance with the embodiment of the disclosure illustrated in FIG. 4 and as a non-limiting example, the control unit 148 may be in communication with a vehicle bus 152 via one or more control unit data-links 154. It is within the scope of this disclosure and as a non-limiting example that the vehicle bus 152 may be a Controller Area network (CAN) Bus or a CAN Bus that conforms to the Society of Automotive Engineers (SAE) J-1939 standards. Additionally, it is within the scope of this disclosure and as a non-limiting example that the one or more control unit data-links 154 may be one or more fiber optic cables and/or one or more electrical cables that put the control unit 148 in optical and/or electrical communication with the vehicle bus 152 of the vehicle 100.

An end of the second transfer case output shaft 120 is drivingly connected to an end of the transfer case 112 opposite the transfer case input shaft 110. Extending from the second transfer case output shaft 120 toward a forward tandem axle system 156 of the tandem axle system 116 of the vehicle 100 is a second shaft 158. It is within the scope of this disclosure and as a non-limiting example that the second shaft 158 of the vehicle 100 may be a drive shaft, a propeller shaft, a Cardan shaft or a double Cardan shaft.

Drivingly connected to an end of the second shaft 158, opposite the second transfer case output shaft 120, is a forward tandem axle system input shaft 160. As a non-limiting example, the forward tandem axle input shaft 160 may be a forward tandem axle differential input shaft, a coupling shaft, stub shaft, a forward tandem axle differential pinion shaft, an inter-axle differential input shaft or an inter-axle differential pinion shaft. Drivingly connected to an end of the forward tandem axle input shaft 160, opposite the second shaft 158, is an inter-axle differential assembly 162 of the forward tandem axle system 156 of the vehicle 100. The inter-axle differential assembly 162 is a device that divides the rotational power generated by the engine 104 between the axles in the vehicle 100. The rotational power is transmitted through the forward tandem axle system 156 as described in more detail below.

As illustrated in FIG. 4 of the disclosure and as a non-limiting example, the inter-axle differential assembly 162 of the vehicle 100 is drivingly connected to a forward tandem axle differential assembly 164 and a forward tandem axle system output shaft 166. The forward tandem axle differential assembly 164 is a set of gears that allows the outer drive wheel(s) of the vehicle 100 to rotate at a faster rate than the inner drive wheel(s).

The forward tandem axle system 156 of the vehicle 100 further includes a first forward tandem axle half shaft 168 and a second forward tandem axle half shaft 170. As illustrated in FIG. 4 of the disclosure and as a non-limiting example, the first forward tandem axle half shaft 168 extends substantially perpendicular to the forward tandem axle input shaft 160 of the vehicle 100. At least a portion of a first end portion 172 of the first forward tandem axle half shaft 168 is drivingly connected to a first forward tandem axle wheel assembly 174 and at least a portion of a second end portion 176 of the first forward tandem axle half shaft 168 is drivingly connected to an end of the forward tandem axle differential assembly 164. It is within the scope of this disclosure and as a non-limiting example that the second end portion 176 of the first forward tandem axle half shaft 168 may be drivingly connected to a forward tandem axle differential side gear, a separate stub shaft, a separate coupling shaft, a first forward tandem axle differential output shaft, a first forward tandem axle half shaft connect and disconnect assembly and/or a shaft that is formed as part of a forward tandem axle differential side gear. According to the embodiment of the disclosure illustrated in FIG. 4 and as a non-limiting example, the forward tandem axle system 156 of the vehicle 100 may further include the use of a first forward tandem axle differential clutch pack assembly 178. The first forward tandem axle differential clutch pack assembly 178 is used to precisely control the amount of torque that is transferred by the engine 104 to the first forward tandem axle wheel assembly 174 of the vehicle 100. In order to apply an amount of force onto the first forward tandem axle differential clutch pack assembly 178, a second motor 180 is operably connected to at least a portion of the first forward tandem axle differential clutch pack assembly 178 of the vehicle 100. It is within the scope of this disclosure and as a non-limiting example that the second motor 180 of the first forward tandem axle differential clutch pack assembly 178 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The second motor 180 of first forward tandem axle differential clutch pack assembly 178 is then in communication with the control unit 148 via one or more second motor data-links 182. The one or more second motor data-links 182 allow for communication between the second motor 180 and the control unit 148 of the vehicle 100. As a non-limiting example, the one or more second motor data-links 182 of the vehicle 100 may be one or more fiber optic cables and/or one or more electrical cables that put the control unit 148 in optical and/or electrical communication with the second motor 180 of the first forward tandem axle differential clutch pack assembly 178.

Extending substantially perpendicular to the forward tandem axle system input shaft 160 is the second forward tandem axle half shaft 170 of the vehicle 100. At least a portion of a first end portion 184 of the second forward tandem axle half shaft 170 is drivingly connected to a second forward tandem axle wheel assembly 186 of the vehicle 100. As illustrated in FIG. 4 of the disclosure and as a non-limiting example, at least a portion of a second end portion 188 of the second forward tandem axle half shaft 170 is drivingly connected to an end of the forward tandem axle differential assembly 164 opposite the first forward tandem axle half shaft 168. It is within the scope of this disclosure and as a non-limiting example that the second end portion 188 of the second forward tandem axle half shaft 170 may be drivingly connected to a forward tandem differential side gear, a separate stub shaft, a separate coupling shaft, a second forward tandem axle differential output shaft, a second forward tandem axle half shaft connect and disconnect assembly and/or a shaft that is formed as part of a forward tandem differential side gear.

In accordance with the embodiment of the disclosure illustrated in FIG. 4 and as a non-limiting example, the forward tandem axle system 156 of the vehicle 100 may further include the use of a second forward tandem axle differential clutch pack assembly 190. The second forward tandem axle differential clutch pack assembly 190 is used to precisely control the amount of torque that is transferred by the engine 104 to the second forward tandem axle wheel assembly 186 of the vehicle 100. In order to apply an amount of force onto the second forward tandem axle differential clutch pack assembly 190, a third motor 192 is operably connected to at least a portion of the second forward tandem axle differential clutch pack assembly 190 of the vehicle 100. It is within the scope of this disclosure and as a non-limiting example that the third motor 192 of the second forward tandem axle differential clutch pack assembly 190 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The third motor 192 of second forward tandem axle differential clutch pack assembly 190 is then in communication with the control unit 148 via one or more third motor data-links 194. The one or more third motor data-links 194 allow for communication between the third motor 192 and the control unit 148 of the vehicle 100. As a non-limiting example, the one or more third motor data-links 194 of the vehicle 100 may be one or more fiber optic cables and/or one or more electrical cables that put the control unit 148 in optical and/or electrical communication with the third motor 192 of the second forward tandem axle differential clutch pack assembly 190.

Drivingly connected to an end of the forward tandem axle system output shaft 166, opposite the inter-axle differential assembly 162, is a third shaft 196. The third shaft 196 extends from the forward tandem axle system output shaft 166 toward a rear tandem axle system 198 of the vehicle 100. As a result, the third shaft 198 drivingly connects the inter-axle differential assembly 162 to the rear tandem axle system 198 of the vehicle 100. It is within the scope of this disclosure and as a non-limiting example that the third shaft 198 may be a drive shaft, a propeller shaft, a Cardan Shaft or a double Cardan shaft. At least a portion of an end of the third shaft 196, opposite the forward tandem axle system output shaft 166, is drivingly connected to an end of a rear tandem axle system input shaft 200. It is within the scope of this disclosure and as a non-limiting example that the rear tandem axle system input shaft 200 may be a rear tandem axle differential input shaft, a coupling shaft, stub shaft or a rear tandem axle differential pinion shaft. Drivingly connected to an end of the rear tandem axle input shaft 200, opposite the third shaft 196, is a rear tandem axle differential assembly 202 of the rear tandem axle system 198 of the vehicle 100. The rear tandem axle differential assembly 202 is a set of gears that allows the outer drive wheel(s) of the vehicle 100 to rotate at a faster rate than the inner drive wheel(s). The rotational power is transmitted through the rear tandem axle system 198 as described in more detail below.

As illustrated in FIG. 4 of the disclosure and as a non-limiting example, the rear tandem axle system 198 further includes a first rear tandem axle half shaft 204 and a second rear tandem axle half shaft 206. The first rear tandem axle half shaft 204 extends substantially perpendicular to the rear tandem axle system input shaft 200 of the vehicle 100. At least a portion of a first end portion 208 of the first rear tandem axle half shaft 204 is drivingly connected to a first rear tandem axle wheel assembly 210 and at least a portion of a second end portion 212 of the first rear tandem axle half shaft 204 is drivingly connected to an end of the reai tandem axle differential assembly 202. It is within the scope of this disclosure and as a non-limiting example that the second end portion 212 of the first rear tandem axle half shaft 204 is drivingly connected to a rear tandem axle differential side gear, a separate stub shaft, a separate coupling shaft, a first rear tandem axle differential output shaft, a first rear tandem axle half shaft connect and disconnect assembly and/or a shaft that is formed as part of a rear tandem axle differential side gear.

According to the embodiment of the disclosure illustrated in FIG. 4 and as a non-limiting example, the rear tandem axle system 198 of the vehicle 100 may further include the use of a first rear tandem axle differential clutch pack assembly 214. The first rear tandem axle differential clutch pack assembly 214 is used to precisely control the amount of torque that is transferred by the engine 104 to the first rear tandem axle wheel assembly 210 of the vehicle 100. In order to apply an amount of force onto the first rear tandem axle differential clutch pack assembly 214, a fourth motor 216 is operably connected to at least a portion of the first rear tandem axle differential clutch pack assembly 214 of the vehicle 100. It is within the scope of this disclosure and as a non-limiting example that the fourth motor 216 of the first rear tandem axle differential clutch pack assembly 214 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The fourth motor 216 of first rear tandem axle differential clutch pack assembly 214 is then in communication with the control unit 148 via one or more fourth motor data-links 218. The one or more fourth motor data-links 218 allow for communication between the fourth motor 216 and the control unit 148 of the vehicle 100. As a non-limiting example, the one or more fourth motor data-links 218 of the vehicle 100 may be one or more fiber optic cables and/or one or more electrical cables that put the control unit 148 in optical and/or electrical communication with the fourth motor 216 of the first rear tandem axle differential clutch pack assembly 214.

Extending substantially perpendicular to the rear tandem axle system input shaft 200 is the second rear tandem axle half shaft 206 of the vehicle 100. At least a portion of a first end portion 220 of the second rear tandem axle half shaft 206 is drivingly connected to a second rear tandem axle wheel assembly 222 of the vehicle 100. As illustrated in FIG. 4 of the disclosure and as a non-limiting example, at least a portion of a second end portion 224 of the second rear tandem axle half shaft 206 is drivingly connected to an end of the rear tandem axle differential assembly 202 opposite the first rear tandem axle half shaft 204. It is within the scope of this disclosure and as a non-limiting example that the second end portion 224 of the second rear tandem axle half shaft 206 may be drivingly connected to a rear tandem differential side gear, a separate stub shaft, a separate coupling shaft, a second rear tandem axle differential output shaft, a second rear tandem axle half shaft connect and disconnect assembly and/or a shaft that is formed as part of a rear tandem differential side gear.

In accordance with the embodiment of the disclosure illustrated in FIG. 4 and as a non-limiting example, the rear tandem axle system 198 of the vehicle 100 may further include the use of a second rear tandem axle differential clutch pack assembly 226. The second rear tandem axle differential clutch pack assembly 226 is used to precisely control the amount of torque that is transferred by the engine 104 to the second rear tandem axle wheel assembly 222 of the vehicle 100. In order to apply an amount of force onto the second rear tandem axle differential clutch pack assembly 226, a fifth motor 228 is operably connected to at least a portion of the second rear tandem axle differential clutch pack assembly 226 of the vehicle 100. It is within the scope of this disclosure and as a non-limiting example that the fifth motor 228 of the second rear tandem axle differential clutch pack assembly 226 may be an electric motor, an actuator, a linear actuator, a pneumatic actuator, a hydraulic actuator, an electromechanical actuator, an electro-magnetic actuator and/or any other type or motor that is able to convert an amount of energy into mechanical energy.

The fifth motor 228 of second rear tandem axle differential clutch pack assembly 226 is then in communication with the control unit 148 via one or more fifth motor data-links 230. The one or more fifth motor data-links 230 allow for communication between the fifth motor 228 and the control unit 148 of the vehicle 100. As a non-limiting example, the one or more fifth motor data-links 230 of the vehicle 100 may be one or more fiber optic cables and/or one or more electrical cables that put the control unit 148 in optical and/or electrical communication with the fifth motor 228 of the second rear tandem axle differential clutch pack assembly 226. While the embodiment of the disclosure illustrated in FIG. 4 illustrates the motors 146, 180, 192, 216 and 228 of the clutch pack assemblies 144, 178, 190, 214 and 226 as being in electrical and/or optical communication with the control unit 148, it is within the scope of this disclosure that one or more of the motors 146, 180, 192, 216 and/or 228 may be in wireless communication with the control unit 148. As a non-limiting example the wireless communication between the motors 146, 180, 192, 216 and/or 228 and the control unit 148 may be a Bluetooth connection, a Wi-fi connection, a cellular connection and/or a radio wave connection. As a result, it is within the scope of this disclosure that the one or more of the motors 146, 180, 192, 216 and/or 228 and the control unit 148 may be operably configured to send and/or receive the data and/or instructions needed for the operation of clutch pack assemblies 144, 178, 190, 214 and/or 226 of the vehicle 100. Additionally, as a result, it is within the scope of this disclosure and as a non-limiting example that the one or more of the motors 146, 180, 192, 216 and/or 228 and the control unit 148 may be operably configured to send and/or receive the data and/or instructions needed in order to determine the kiss point of one or more of the clutch pack assemblies 144, 178, 190, 214 and/or 226 of the vehicle 100. Furthermore, while the embodiment of the disclosure illustrated in FIG. 4 illustrates the control unit 148 being in electrical and/or optical communication with the vehicle bus 152 of the vehicle 100, it is within the scope of this disclosure that the control unit 148 may be wireless communication with the vehicle bus 152. As a non-limiting example the wireless communication between the control unit 148 and the vehicle bus 152 may be a Bluetooth connection, a Wi-fi connection, a cellular connection and/or a radio wave connection. As a result, it is within the scope of this disclosure that the control unit 148 and the vehicle bus 152 may be operably configured to send and/or receive the data and/or instructions needed for the operation of the clutch pack assemblies 144, 178, 190, 214 and/or 226 of the vehicle 100. Additionally, as a result, it is within the scope of this disclosure and as a non-limiting example that the control unit 148 and the vehicle bus 152 may be operably configured to send and/or receive the data and/or instructions needed in order to determine the kiss point of one or more of the clutch pack assemblies 144, 178, 190, 214 and/or 226 of the vehicle 100.

It is within the scope of this disclosure and as a non-limiting example that a kiss point for one or more of the clutch pack assemblies 144, 178, 190, 214 and/or 226 may be determined by utilizing a clutch kiss point characterization method according to an embodiment of the disclosure.

Figure 5:
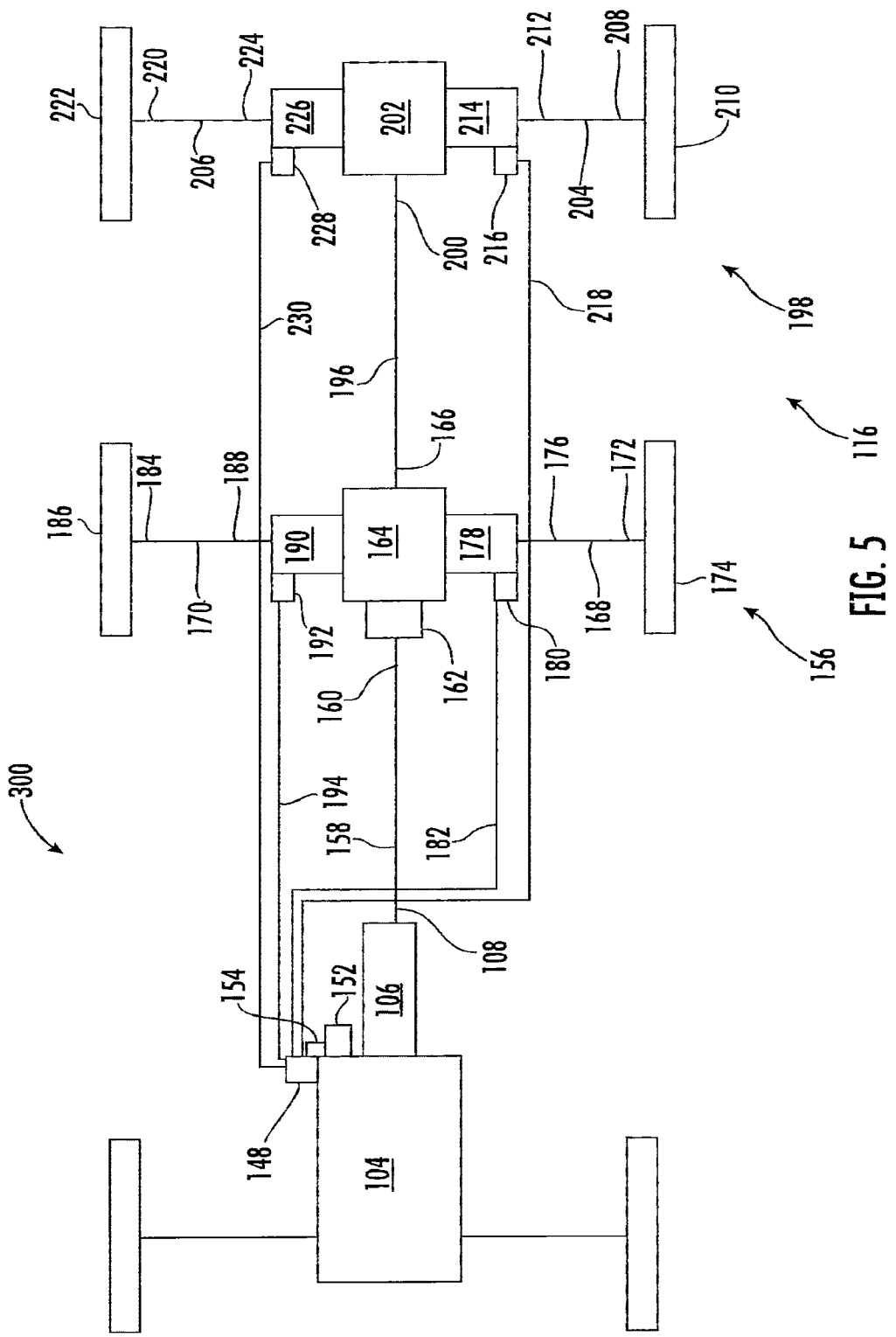
FIG. 5 is a schematic top-plan view of another vehicle having one or more drive units with a clutch pack assembly where the kiss point is characterized according to an embodiment of the disclosure.

FIG. 5 is a schematic top-plan view of a vehicle 300 having one or more clutching or clutch pack assemblies where the kiss point is characterized according to an embodiment of the disclosure. The vehicle 300 illustrated in FIG. 5 is the same as the vehicle 100 illustrated in FIG. 4, except where specifically noted below. As illustrated in FIG. 5 of the disclosure and as a non-limiting example, the vehicle 300 does not include the use of the transfer case 112 that is drivingly connected to at least a portion of the front axle system differential assembly 126 having the one or more front axle differential clutch pack assemblies 144.

In accordance with the embodiment of the disclosure illustrated in FIG. 5 and as a non-limiting example, at least a portion of the end of the transmission output shaft 108, opposite the transmission 106, is drivingly connected to at least a portion of the end of the second shaft 158 opposite the forward tandem axle system input shaft 160. As a result, in accordance with the embodiment of the disclosure illustrated in FIG. 5 and as a non-limiting example, the second shaft 158 of the vehicle 300 extends from the transmission output shaft 108 toward the inter-axle differential assembly 162 of the forward tandem axle system 156 of the vehicle 300.

It is within the scope of this disclosure and as a non-limiting example that a kiss point for one or more of the clutch pack assemblies 178, 190, 214 and/or 226 may be determined by utilizing a clutch kiss point characterization method according to an embodiment of the disclosure.

Figure 6:
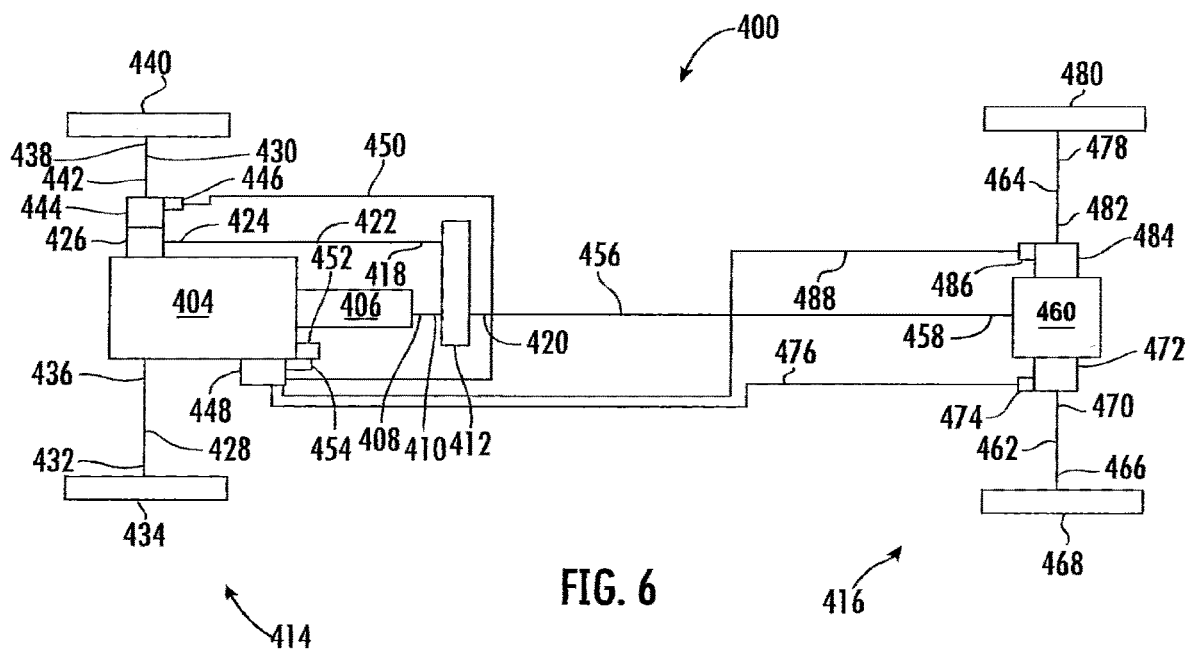
FIG. 6 is a schematic top-plan view of yet another vehicle having one or more drive units with a clutch pack assembly where the kiss point is characterized according to an embodiment of the disclosure.

FIG. 6 is a schematic top-plan view of a vehicle 400 having one or more clutching or clutch pack assemblies where the kiss point is characterized according to an embodiment of the disclosure. As illustrated in FIG. 6 of the disclosure, the vehicle 400 has an engine 404 which is drivingly connected to a transmission 406. As non-limiting example, the engine 404 of the vehicle 400 may be an internal combustion engine, an electric motor, a steam turbine and/or a gas turbine. A transmission output shaft 408 is then drivingly connected to an end of the transmission 406 opposite the engine 404. The transmission 406 is a power management system which provides controlled application of the rotational power generated by the engine 404 by means of a gear box.

The transmission output shaft 408 is drivingly connected to a transfer case input shaft 410 which in turn is drivingly connected to a transfer case 412. The transfer case 412 is used in four-wheel drive and/or all-wheel-drive (A WD) vehicles to transfer the rotational power from the transmission 406 to a front axle system 414 and a rear axle system 416 by utilizing a series of gears and drive shafts. Additionally, the transfer case 412 allows the vehicle 400 to selectively operate in either a two-wheel drive mode of a four-wheel/AWD drive mode. As illustrated in FIG. 6 of the disclosure and as a non-limiting example, the transfer case 412 includes a first transfer case output shaft 418 and a second transfer case output shaft 420.

A first shaft 422 extends from the first transfer case output shaft 418 toward the front axle system 414 of the vehicle 400. The first shaft 422 transmits the rotational power from the transfer case 412 to the front axle system 414 thereby drivingly connecting the transfer case 412 to the front axle system 414 of the vehicle 400. It is within the scope of this disclosure and as a non-limiting example that the first shaft 422 may be a drive shaft, a propeller shaft, a Cardan shaft or a double Cardan shaft. Drivingly connected to an end of the first shaft 422, opposite the first transfer cane output shaft 418, is a front axle system input shaft 424. The front axle system input shaft 424 drivingly connects the first shaft 422 to a front axle differential assembly 426 of the front axle system 414 of the vehicle 400. As illustrated in FIG. 6 of the disclosure and as a non-limiting example, at least a portion of an end of the front axle system input shaft 424, opposite the first shaft 422, is drivingly connected to the front axle differential assembly 426. It is within the scope of this disclosure and as a non-limiting example that the front axle system input shaft 424 may be front differential input shaft, a coupling shaft, stub shaft or a front differential pinion shaft. The front axle differential assembly 426 is a set of gears that allows the outer drive wheel(s) of the vehicle 400 to rotate at a faster rate that the inner drive wheel(s). The rotational power is transmitted through the front axle system 414 as described in more detail below.

The front axle system 414 further includes a first front axle half shaft 428 and a second front axle half shaft 430. As illustrated in FIG. 6 of the disclosure and as a non-limiting example, the first front axle half shaft 428 extends substantially perpendicular to the front axle system input shaft 424 of the vehicle 400. At least a portion of a first end portion 432 of the first front axle half shaft 428 is drivingly connected to a first front axle wheel assembly 434 and at least a portion of a second end portion 436 of the first front axle half shaft 428 is drivingly connected to an end of the front axle differential assembly 426. It is within the scope of this disclosure and as a non-limiting example that the second end portion 436 of the first front axle half shaft 428 may be drivingly connected to a front differential side gear, a separate stub shaft, a separate coupling shaft, a first front axle differential output shaft, a first front axle have shaft connect and disconnect assembly and/or a shaft that is formed as part of a front differential side gear.

Extending substantially perpendicular to the front axle system input shaft 424 is the second front axle half shaft 430 of the vehicle 400. At least a portion of a first end portion 438 of the second front axle half shaft 430 is drivingly connected to a second front axle wheel assembly 440 of the vehicle 400. As illustrated in FIG. 6 of the disclosure and as a non-limiting example, at least a portion of a second end portion 442 of the second front axle half shaft 430 is drivingly connected to an end of the front axle differential assembly 426 opposite the first front axle half shaft 428. It is within the scope of this disclosure and as a non-limiting example that the second end portion 442 of the second front axle half shaft 430 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

According to the embodiment of the disclosure illustrated in FIG. 6 and as a non-limiting example, the front axle system 414 of the vehicle 400 may further include the use of one or more front axle differential clutch pack assemblies 444. The one or more front axle differential clutch pack assemblies 444 are used to precisely control the amount of torque that is transferred by the engine 404 to the first and/or second front axle wheel assemblies 434 and/or 440 of the vehicle 400. In order to apply an amount of force onto the one or more front axle differential clutch pack assemblies 444, a first motor 446 is operably connected to at least a portion of the one or more front axle differential clutch pack assemblies 444 of the vehicle 400. It is within the scope of this disclosure and as a non-limiting example that the first motor 446 of the one or more front axle differential clutch pack assemblies 444 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The first motor 446 of the one or more front axle differential clutch pack assemblies 444 is then in communication with a control unit 448 via one or more first motor data-links 450. The one or more first motor data-links 450 allow for communication between the first motor 446 and the control unit 448 of the vehicle 400. As a non-limiting example, the one or more first motor data-links 450 of the vehicle 400 may be one or more fiber optic cables and/or one or more electrical cables that put the control unit 448 in optical and/or electrical communication with the first motor 446 of the one or more front axle differential clutch pack assemblies 444.

In accordance with the embodiment of the disclosure illustrated in FIG. 6 and as a non-limiting example, the control unit 448 may be in communication with a vehicle bus 452 via one or more control unit data-links 454. It is within the scope of this disclosure and as a non-limiting example that the vehicle bus 452 may be a CAN Bus or a CAN Bus that conforms to the SAE J-1939 standards. Additionally, it is within the scope of this disclosure and as a non-limiting example that the one or more control unit data-links 454 may be one or more fiber optic cables and/or one or more electrical cables that put the control unit 448 in optical and/or electrical communication with the vehicle bus 452 of the vehicle 400.

An end of the second transfer case output shaft 420 is drivingly connected to an end of the transfer case 412 opposite the transfer case input shaft 410. Extending from the second transfer case output shaft 420, toward the rear axle system 416 of the vehicle 400, is a second shaft 456. It is within the scope of this disclosure and as a non-limiting example that the second shaft 456 of the vehicle 400 may be a drive shaft, a propeller shaft, a Cardan shaft or a double Cardan shaft.

Drivingly connected to an end of the second shaft 456, opposite the second transfer case output shaft 420, is a rear axle system input shaft 458. As a non-limiting example, the rear axle input shaft 458 may be a rear axle differential input shaft, a coupling shaft, stub shaft or a rear axle differential pinion shaft. Drivingly connected to an end of the rear axle input shaft 458, opposite the second shaft 456, is a rear axle differential assembly 460 of the rear axle system 416 of the vehicle 400. The rear axle differential assembly 460 is a device that divides the rotational power generated by the engine 404 between the axles in the vehicle 400. The rotational power is transmitted through the rear axle system 416 as described in more detail below.

As illustrated in FIG. 6 of the disclosure and as a non-limiting example, the rear axle system 416 further includes a first rear axle half shaft 462 and a second rear axle half shaft 464. The first rear axle half shaft 462 extends substantially perpendicular to the rear axle system input shaft 458 of the vehicle 400. At least a portion of a first end portion 466 of the first rear axle half shaft 462 is drivingly connected to a first rear axle wheel assembly 468 and at least a portion of a second end portion 470 of the first rear axle half shaft 462 is drivingly connected to an end of the rear axle differential assembly 460. It is within the scope of this disclosure and as a non-limiting example that the second end portion 470 of the first rear axle half shaft 462 is drivingly connected to a rear axle differential side gear, a separate stub shaft, a separate coupling shaft, a first rear axle differential output shaft, a first rear axle half shaft connect and disconnect assembly and/or a shaft that is formed as part of a rear axle differential side gear.

According to the embodiment of the disclosure illustrated in FIG. 6 and as a non-limiting example, the rear axle system 416 of the vehicle 400 may further include the use of a first rear axle differential clutch pack assembly 472. The first rear axle differential clutch pack assembly 472 is used to precisely control the amount of torque that is transferred by the engine 404 to the first rear axle wheel assembly 468 of the vehicle 400. In order to apply an amount of force onto the first rear axle differential clutch pack assembly 472, a second motor 474 is operably connected to at least a portion of the first rear axle differential clutch pack assembly 472 of the vehicle 400. It is within the scope of this disclosure and as a non-limiting example that the second motor 474 of the first rear axle differential clutch pack assembly 472 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The second motor 474 of first rear axle differential clutch pack assembly 472 is then in communication with the control unit 448 via one or more second motor data-links 476. The one or more second motor data-links 476 allow for communication between the second motor 474 and the control unit 448 of the vehicle 400. As a non-limiting example, the one or more second motor data-links 476 of the vehicle 400 may be one or more fiber optic cables and/or one or more electrical cables that put the control unit 448 in optical and/or electrical communication with the second motor 474 of the first rear axle differential clutch pack assembly 472.

Extending substantially perpendicular to the rear axle system input shaft 458 is the second rear axle half shaft 464 of the vehicle 400. At least a portion of a first end portion 478 of the second rear axle half shaft 464 is drivingly connected to a second rear axle wheel assembly 480 of the vehicle 400. As illustrated in FIG. 6 of the disclosure and as a non-limiting example, at least a portion of a second end portion 482 of the second rear axle half shaft 464 is drivingly connected to an end of the rear axle differential assembly 460 opposite the first rear axle half shaft 462. It is within the scope of this disclosure and as a non-limiting example that the second end portion 482 of the second rear axle half shaft 464 may be drivingly connected to a rear differential side gear, a separate stub shaft, a separate coupling shaft, a second rear axle differential output shaft, a second rear axle half shaft connect and disconnect assembly and/or a shaft that is formed as part of a rear differential side gear. In accordance with the embodiment of the disclosure illustrated in FIG. 6 and as a non-limiting example, the rear axle system 416 of the vehicle 400 may further include the use of a second rear axle differential clutch pack assembly 484. The second rear axle differential clutch pack assembly 484 is used to precisely control the amount of torque that is transferred by the engine 404 to the second rear axle wheel assembly 480 of the vehicle 400. In order to apply an amount of force onto the second rear axle differential clutch pack assembly 484, a third motor 486 is operably connected to at least a portion of the second rear axle differential clutch pack assembly 484 of the vehicle 400. It is within the scope of this disclosure and as a non-limiting example that the third motor 486 of the second rear axle differential clutch pack assembly 484 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The third motor 486 of second rear axle differential clutch pack assembly 484 is then in communication with the control unit 448 via one or more third motor data-links 488. The one or more third motor data-links 488 allow for communication between the third motor 486 and the control unit 448 of the vehicle 400. As a non-limiting example, the one or more third motor data-links 488 of the vehicle 400 may be one or more fiber optic cables and/or one or more electrical cables that put the control unit 448 in optical and/or electrical communication with the third motor 486 of the second rear axle differential clutch pack assembly 484.

While the embodiment of the disclosure illustrated in FIG. 6 illustrates the motors 446, 474 and 486 of the clutch pack assemblies 444, 472 and 484 as being in electrical and/or optical communication with the control unit 448, it is within the scope of this disclosure that one or more of the motors 446, 474 and/or 486 may be in wireless communication with the control unit 448. As a non-limiting example the wireless communication between the motors 446, 474 and/or 486 and the control unit 448 may be a Bluetooth connection, a Wi-fi connection, a cellular connection and/or a radio wave connection. As a result, it is within the scope of this disclosure that the one or more of the motors 446, 474 and/or 486 and the control unit 448 may be operably configured to send and/or receive the data and/or instructions needed for the operation of clutch pack assemblies 444, 472 and/or 484 of the vehicle 400. Additionally, as a result, it is within the scope of this disclosure and as a non-limiting example that the one or more of the motors 446, 474 and/or 486 and the control unit 448 may be operably configured to send and/or receive the data and/or instructions needed in order to determine the kiss point of one or more of the clutch pack assemblies 444, 472 and/or 484 of the vehicle 400.

Furthermore, while the embodiment of the disclosure illustrated in FIG. 6 illustrates the control unit 448 being in electrical and/or optical communication with the vehicle bus 452 of the vehicle 400, it is within the scope of this disclosure that the control unit 448 may be wireless communication with the vehicle bus 452. As a non-limiting example the wireless communication between the control unit 448 and the vehicle bus 452 may be a Bluetooth connection, a Wi-fi connection, a cellular connection and/or a radio wave connection. As a result, it is within the scope of this disclosure that the control unit 448 and the vehicle bus 452 may be operably configured to send and/or receive the data and/or instructions needed for the operation of the clutch pack assemblies 444, 472 and/or 484 of the vehicle 400. Additionally, as a result, it is within the scope of this disclosure and as a non-limiting example that the control unit 448 and the vehicle bus 452 may be operably configured to send and/or receive the data and/or instructions needed in order to determine the kiss point of one or more of the clutch pack assemblies 444, 472 and/or 484 of the vehicle 400.

It is within the scope of this disclosure and as a non-limiting example that a kiss point for one or more of the clutch pack assemblies 444, 472 and/or 484 may be determined by utilizing a clutch kiss point characterization method according to an embodiment of the disclosure.

Figure 7:
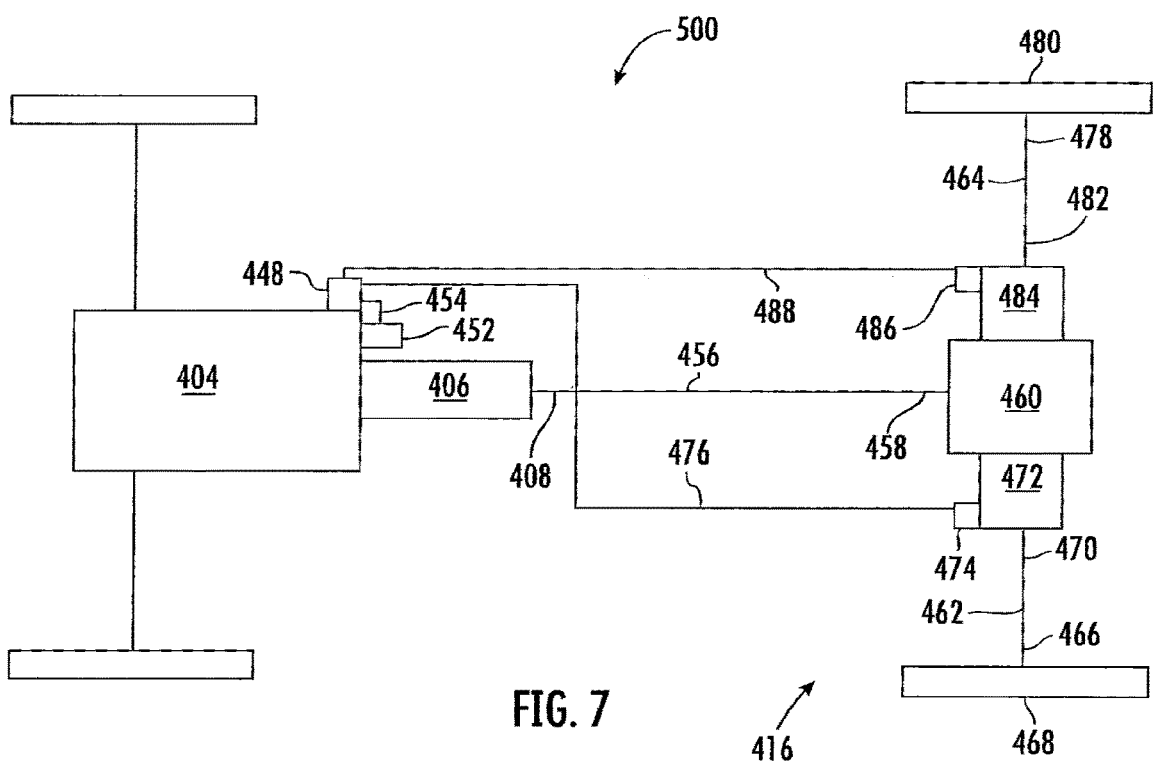
FIG. 7 is a schematic top-plan view of still yet another vehicle having one or more drive units with a clutch pack assembly where the kiss point is characterized according to an embodiment of the disclosure.

FIG. 7 is a schematic top-plan view of a vehicle 500 having one or more clutching or clutch pack assemblies where the kiss point is characterized according to an embodiment of the disclosure. The vehicle 500 illustrated in FIG. 7 is the same as the vehicle 400 illustrated in FIG. 6, except where specifically noted below. As illustrated in FIG. 7 of the disclosure and as a non-limiting example, the vehicle 500 does not include the use of the transfer case 412 that is drivingly connected to at least a portion of the front axle system differential assembly 426 having the one or more front axle differential clutch pack assemblies 444.

In accordance with the embodiment of the disclosure illustrated in FIG. 7 of the disclosure and as a non-limiting example, at least a portion of the end of the transmission output shaft 408, opposite the transmission 406, is drivingly connected to at least a portion of the end of the second shaft 465 opposite the rear axle system input shaft 458. As a result, in accordance with the embodiment of the disclosure illustrated in FIG. 7 and as a non-limiting example, the second shaft 456 of the vehicle 500 extends from the transmission output shaft 408 toward the rear axle differential assembly 460 of the rear axle system 416 of the vehicle 500.

It is within the scope of this disclosure and as a non-limiting example that a kiss point for one or more of the clutch pack assemblies 472 and/or 484 may be determined by utilizing a clutch kiss point characterization method according to an embodiment of the disclosure.

Figure 8:
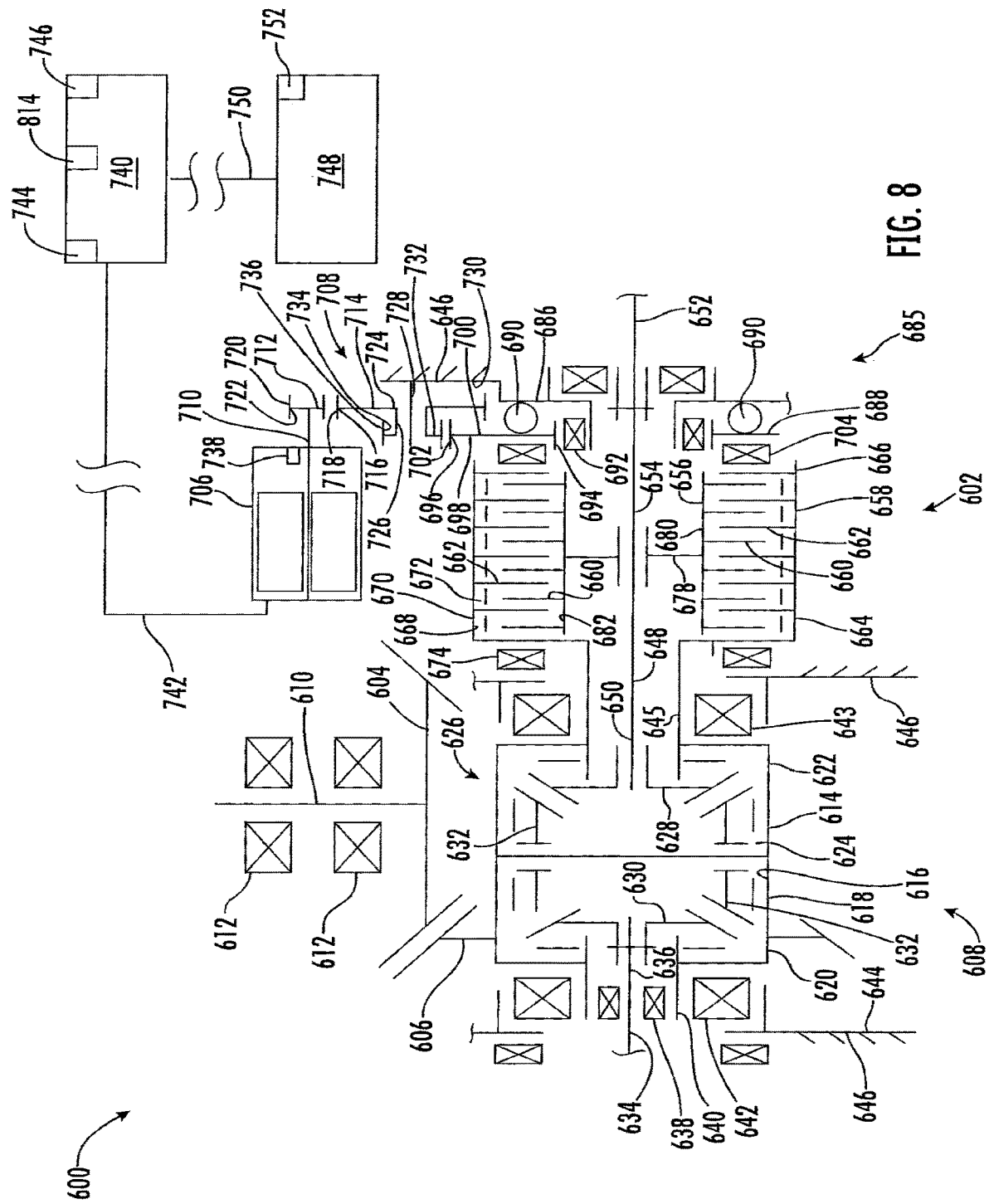
FIG. 8 is a schematic top-plan view of a drive unit assembly having a one or more clutch pack assemblies where the kiss point is characterized according to an embodiment of the disclosure.

FIG. 8 is a schematic top-plan view of a drive unit assembly 600 having a one or more clutch pack assemblies 602 where the kiss point is characterized according to an embodiment of the disclosure. As illustrated in FIG. 8 of the disclosure and as a non-limiting example, the drive unit assembly 600 includes a pinion gear 604 that is drivingly connected to and meshingly engaged with a ring gear 606 of a differential assembly 608. At least a portion of a pinion gear shaft 610 is rotationally supported within one or more pinion shaft bearings 612 of the drive unit assembly 600. It is within the scope of this disclosure and as a non-limiting example that the differential assembly 608 of the drive unit assembly 600 may be a front axle differential assembly, a rear axle differential assembly, a forward tandem axle differential assembly and/or a rear tandem axle differential assembly of a vehicle (not shown).

At least a portion of an end of the pinion shaft 610, opposite the pinion gear 604 is drivingly connected to a source of rotational power (not shown). It is within the scope of this disclosure and as a non-limiting example that the source (not shown) may be an engine, a transmission, a transfer case, a propeller shaft a drive shaft, universal joint assembly and/or a constant velocity joint assembly.

Drivingly connected to at least a portion of the ring gear 608 of the differential assembly 608 is a differential case 614 having an inner surface 616, an outer surface 618, a first end portion 620 and a second end portion 622. The inner surface 616 and the outer surface 618 of the differential case 614 defines a hollow portion 624 therein. Disposed with in at least a portion of the hollow portion 624 of the differential case 614 is a differential gear set 626 having a first side gear 628, a second side gear 630 and one or more bevel gears 632 that are drivingly and meshingly engaged with the first and second side gears 628 and 630 of the differential gear set 626. Extending co-axially with at least a portion of the second side gear 630 of the differential assembly 608 is a second axle half shaft 634 having a first end portion (not shown) and a second end portion 636. As illustrated in FIG. 8 and as a non-limiting example, at least a portion of the second end portion 636 of the second axle half shaft 634 is drivingly connected to at least a portion of the second side gear 630 of the differential assembly 608. At least a portion of the first end portion (not shown) of the second axle half shaft 634 is drivingly connected to at least a portion of a second wheel assembly (not shown). It is within the scope of this disclosure and as a non-limiting example that the second axle half shaft 634 may be a second front axle half shaft, a second rear axle half shaft, a second forward tandem axle half shaft and/or a second rear tandem axle half shaft.

At least a portion of the second axle half shaft 634 is rotationally supported by a second axle half shaft bearing 638. In accordance with the embodiment of the disclosure illustrated in FIG. 8 and as a non-limiting example, at least a portion of the second axle half shaft bearing 638 is interposed between the second axle half shaft 634 and first reduced diameter portion 640 of the differential case 614. The first reduced diameter portion 640 of the differential case 614 extends axially outboard from at least a portion of the first end portion 620 of the differential case 614.

Disposed radially outboard from at least a portion of the first reduced diameter portion 640 of the differential case 614 is a first differential case bearing 642. As illustrated in FIG. 8 of the disclosure and as a non-limiting example, at least a portion of the first differential case bearing 642 is interposed between the differential case 614 and an inner surface 644 of a housing 646 of the drive unit assembly 600. The first differential case bearing 642 of the drive unit assembly 600 provides rotational support for at least a portion of the first end portion 620 of the differential case 614.

Additionally, it is within the scope of this disclosure and as a non-limiting example the first differential case bearing 642 may also provide axial load support for the differential case 614 allowing for rotation of the differential case 614 relative to the housing 646 of the drive unit assembly 600 when in operation.

A second differential case bearing 643 is interposed between the outer surface 618 of a second reduced diameter portion 645 of the differential case 614 and the inner surface 644 the housing 646 of the drive unit assembly 600. In accordance with the embodiment of the disclosure illustrated in FIG. 8 and as a non-limiting example, the second reduced diameter portion 645 of the differential case 614 extends axially outboard from at least a portion of the second end portion 622 of the differential case 614. The second differential case bearing 643 of the drive unit assembly 600 provides rotational support for at least a portion of the second end portion 622 of the differential case 614. Additionally, it is within the scope of this disclosure and as a non-limiting example the second differential case bearing 643 may also provide axial load support for the differential case 614 allowing for rotation of the differential case 614 relative to the housing 646 of the drive unit assembly 600 when in operation.

Extending co-axially with at least a portion of the first side gear 628 of the differential assembly 608 is a first axle half shaft 648 having a first end portion 650, a second end portion 652 and an intermediate portion 654 interposed between the first and second end portions 650 and 652 of the first axle half shaft 648. As illustrated in FIG. 8 of the disclosure and as a non-limiting example, at least a portion of the first end portion 650 of the first axle half shaft 648 is drivingly connected to at least a portion of the first side gear 628 of the differential assembly 608 of the drive unit assembly 600. At least a portion of the second end portion 652 of the first axle half shaft 648 is drivingly connected to at least a portion of a first wheel assembly (not shown). It is within the scope of this disclosure and as a non-limiting example that the first axle half shaft 648 may be a first front axle half shaft, a first rear axle half shaft, a first forward tandem axle half shaft and/or a first rear tandem axle half shaft.

Drivingly connected to at least a portion of the first axle half shaft 648 and the differential case 614 of the differential assembly 608 is the one or more clutch pack assemblies 602 of the drive unit assembly 600. As illustrated in FIG. 8 of the disclosure and as a non-limiting example, the one or more clutch pack assemblies 602 have a clutch can 656, a clutch drum 658, a first plurality of clutch plates 660 and a second plurality of clutch plates 662. At least a portion of the clutch drum 658 of the one or more clutch pack assemblies 602 extends co-axially with at least a portion of the first axle half shaft 648 and the differential case 614. The clutch drum 658 has a first end portion 664, a second end portion 666, an inner surface 668 and an outer surface 670 defining a hollow portion 672 therein. In accordance with the embodiment of the disclosure illustrated in FIG. 8 and as a non-limiting example, at least a portion of the first end portion 664 of the clutch drum 658 is integrally connected to at least a proton of the second end portion 622 of the differential case 614. Interposed between the first end portion 664 of the clutch drum 658 and the housing 646 is a first thrust bearing 674. The first thrust bearing 674 of the one or more clutch pack assemblies 602 of the drive unit assembly 600 allows for relative rotation and reduces the overall amount of friction between the clutch drum 658 and the housing 646 of the drive unit assembly 600.

Drivingly connected to at least a portion of the inner surface 668 of the clutch drum 658 of the one or more clutch pack assemblies 602 is the first plurality of clutch plates 660. Additionally, the first plurality of clutch plates 660 of the one or more clutch pack assemblies 602 are mounted to the clutch drum 658 so as to allow the first plurality of clutch plates 660 to slide axially along the inner surface 668 of the clutch drum 658 while remaining drivingly connected to the clutch drum 658.

Extending co-axially with at least a portion of the first axle half shaft 648 and the clutch drum 658 is the clutch can 656 of the one or more clutch pack assemblies 602 of the drive unit assembly 600. As illustrated in FIG. 8 of the disclosure and as a non-limiting example, at least a portion of the clutch can 656 of the one or more clutch pack assemblies 602 is disposed within the hollow portion 672 of the clutch drum 658. A radially extending portion 678 extends radially inward from at least a portion of an inner surface 680 of the clutch can 656 of the one or more clutch pack assemblies 602. An end of the radially extending portion 678, opposite the clutch can 656, is drivingly connected to at least a portion of the intermediate portion 654 of the first axle half shaft 648 of the drive unit assembly 600. It is within the scope of this disclosure and as a non-limiting example that the radially extending portion 678 of the clutch can 656 may be connected to at least a portion of the first axle half shaft 648 by using one or more mechanical fasteners, one or more adhesives, one or more welds, a spline connection and/or a threaded connection.

Drivingly connected to at least a portion of an outer surface 682 of the clutch can 656 of the one or more clutch pack assemblies 602 is the second plurality of clutch plates 662. Additionally, the second plurality of clutch plates 662 of the one or more clutch pack assemblies 602 are mounted to the clutch can 656 so as to allow the second plurality of clutch plates 662 to slide axially along the outer surface 682 of the clutch can 656 while remaining drivingly connected to the clutch can 656. As illustrated in FIG. 8 of the disclosure and as a non-limiting example, the second plurality of clutch plates 662 are interleafed with the first plurality of clutch plates 660 of the one or more clutch pack assemblies 602. It is within the scope of this disclosure and as a non-limiting example that the one or more clutch pack assemblies 602 may further include the use of one or more biasing members (not shown) that are interposed between one or more of the first and second plurality of clutch plates 660 and 662.

Disposed axially outboard from at least a portion of the clutch can 656 and the clutch drum 658 is one or more force translational devices 685 of the one or more clutch pack assemblies 602 of the drive unit assembly 600. The one or more force translational devices 685 are selectively engageable with the first and/or second plurality of clutch plates 660 and/or 662 of the one or more clutch pack assemblies 602. In accordance with the embodiment of the disclosure illustrated in FIG. 8 and as a non-limiting example, the one or more force translational devices 685 includes a pressure plate 686, an actuator plate 688 and one or more balls 690 interposed between the pressure plate 686 and the actuator plate 688. As a non-limiting example, the one or more force translational devices 685 may be a ball and ramp assembly.

The pressure plate 686 of the one or more force translational devices 685 resists the axial force applied thereto thereby allowing the actuator plate 688 to translate axially toward the first and second plurality of clutch plates 660 and 662 of the one or more clutch pack assemblies 602 of the drive unit assembly 600. It is within the scope of this disclosure and as a non-limiting example that the pressure plate 686 of the one or more force translational devices 685 may be rotatable, non-rotatable and integrally connected to at least a portion of the housing 646 or non-rotatable and forms a part of the housing 646 of the drive unit assembly 600.

Interposed between the actuator plate 688 and the pressure plate 686 of the one or more force translational devices 685 or between the actuator plate 688 and the housing 646 of the drive unit assembly 600 is a bearing 692. The bearing 692 allows for relative rotation of the actuator plate 688 and the pressure plate 686 and/or the housing 646 of the drive unit assembly 600 when in operation.

As illustrated in FIG. 8 of the disclosure and as a non-limiting example, the actuator plate 688 of the one or more force translational devices 685 has an inner surface 694, an outer surface 696 a first side 698 and a second side 700.

Circumferentially extending along at least a portion of the outer surface 696 of the actuator plate 688 of the one or more force translational devices 685 is a plurality of actuator plate teeth 702. At least a portion of one or more of the one or more balls 690 of the one or more force translational devices 685 are disposed within one or more pressure plate grooves (not shown) in the pressure plate 686 and one or more actuator plate grooves (not shown) in the actuator plate 688. The one or more actuator plate grooves (not shown) are in the second side 700 of the actuator plate 688 and the one or more pressure plate grooves (not shown) are in a side of the pressure plate 686 facing the actuator plate 688 of the one or more force translational devices 685. Additionally, the one or more pressure plate grooves (not shown) and the one or more actuator plate grooves (not shown) have a variable depth such that when the actuator plate 688 is rotated, the actuator plate 688 is translated axially away from the pressure plate 686 toward the first and second plurality of clutch plates 660 and 662 of the one or more clutch pack assemblies 602 of the drive unit assembly 600.

Interposed between the actuator plate 688 and the first and second plurality of clutch plates 660 and 662 of the one or more clutch pack assemblies 602 is a second thrust bearing 704. The second thrust bearing 704 of the one or more clutch pack assemblies 602 of the drive unit assembly 600 allows for relative rotation and reduces the overall amount of friction between the actuator plate 688 and the first and second plurality of clutch plates 660 and 662 of the one or more clutch pack assemblies 602 of the drive unit assembly 600. When in operation, the actuator plate 688 will translate the second thrust bearing 704 axially toward the first and second plurality of clutch plates 660 and 662 until at least a portion of the second thrust bearing 704 is in direct contact with at least a portion of the first and/or second plurality of clutch plates 660 and 662. Once the second thrust bearing 704 is in direct contact with the first and/or second plurality of clutch plates 660 and 662, the force from the actuator plate 688 will be transmitted to the first and second plurality of clutch plates 660 and 662 via the second thrust bearing 704. This allows the one or more clutch pack assemblies 602 of the drive unit assembly 600 to precisely control the amount of torque that is transferred by an engine (not shown) to the wheel assemblies (not shown) of the vehicle (not shown).

Disposed radially outboard from at least a portion of the actuator plate 688 of the one or more force translational devices 685 is one or more motors 706 and one or more gear sets 708. Drivingly connected to at least a portion of the one or more motors 706 of the drive unit assembly 600 is a motor output shaft 710. It is within the scope of this disclosure and as a non-limiting example that the one or more motors 706 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

At least a portion of an end of the motor output shaft 710, opposite the one or more motors 706, is drivingly connected to at least a portion of a first gear 712 of the one or more gear sets 708. It is within the scope of this disclosure and as a non-limiting example that the first gear 712 may be connected to at least a portion of the motor output shaft 710 by using one or more mechanical fasteners, one or more welds, one or more adhesives, a splines connection and/or a threaded connection.

A second or intermediate gear 714 of the one or more gear sets 708 is drivingly connected to and disposed radially inboard from at least a portion of the first gear 712 of the one or more gear sets 708. Circumferentially extending from at least a portion of an outer surface 716 of the second or intermediate gear 714 is a plurality of second gear teeth 718. The plurality of second gear teeth 718 of the second or intermediate gear 714 are complementary to and meshingly engaged with a plurality of first gear teeth 720 circumferentially extending from at least a portion of an outer surface 722 of the first gear 712.

Drivingly connected to at least a portion of an inner surface 724 of the second or intermediate gear 714 is a gear shaft 726. At least a portion of the gear shaft 726 of the one or more gear sets 708 is rotationally supported by a support shaft 728. As illustrated in FIG. 8 of the disclosure and as a non-limiting example, the support shaft 728 extends axially inboard from at least a portion of an inner surface 730 of the housing 646 of the drive unit assembly 600. It is within the scope of this disclosure and as a non-limiting example that at least a portion of the support shaft 728 may be integrally connected to at least a portion of the inner surface 730 of the housing 646 by using one or more mechanical fasteners, one or more welds, one or more adhesives and/or by using a threaded connection. Additionally, it is within the scope of this disclosure and as a non-limiting example that the support shaft 728 may be integrally formed as part of the inner surface 730 of the housing 646 of the drive unit assembly 600.

As illustrated in FIG. 8 of the disclosure and as a non-limiting example, at least a portion of a third gear 732 is drivingly connected to at least a portion of an end of the gear shaft 726 opposite the second or intermediate gear 714 of the one or more gear sets 708. Circumferentially extending along at least a portion of an outer surface 734 of the third gear 732 is a plurality of third gear teeth 736. The plurality of third gear teeth 736 of the third gear 732 are complementary to and meshingly engaged with the plurality of actuator plate teeth 702 of the actuator plate 688 of the one or more force translational devices 685. As a result, the third gear 732 drivingly connects the one or more motors 706 to the actuator plate 688 of the one or more force translational devices 685 of the drive unit assembly 600.

In accordance with the embodiment of the disclosure illustrated in FIG. 8 and as a non-limiting example, the one or more motors 706 of the drive unit assembly 600 may further include the use of one or more first sensors 738. The one or more first sensors 738 of the one or more motors 706 are disposed radially outboard from at least a portion of the motor output shaft 710 and are operably configured to detect and/or determine the position of the motor output shaft 710. It is within the scope of this disclosure and as a non-limiting example that the one or more first sensors 738 of the one or more motors 706 may be one or more Hall Effect sensors, one or more Hall sensors, one or more rotary encoders, one or more proximity sensors, one or more capacitive displacement sensors and/or any other type of sensor that is able to detect and/or determine the position of the motor output shaft 710 of the drive unit assembly 600.

The one or more motors 706 and the one or more first sensors 738 in the one or more motors 706 are in communication with one or more control units 740 via one or more motor data-links 742. The one or more motor data-links 742 allow for communication between the one or more motors 706 and the one or more control units 740. Additionally, the one or more motor data-links 742 allow for communication between the one or more first sensors 738 of the one or more motors 706 and the one or more control units 740. As a non-limiting example the one or more motor data-links 742 may be one or more fiber optic cables and/or one or more electrical cables that put the one or more control units 740 in optical and/or electrical communication with the one or more motors 706 and the one or more first sensors 738 of the one or more motors 706.

As illustrated in FIG. 8 of the disclosure and as a non-limiting example, the one or more control units 740 may further include the use of one or more second sensors 744 and/or one or more data processors 746. The one or more second sensors 744 of the one or more control units 740 are operably configured to detect and/or determine the amount of current being supplied to the motor 706 of the drive unit assembly 600. It is within the scope of this disclosure and as a non-limiting example that the one or more second sensors 744 of the one or more control units 740 may be one or more Hall Effect current sensors, one or more Hall current sensors, one or more resistors and/or any other type of sensor that is able to detect and/or determine the amount of electrical current in one or more wires supplying the one or more motors 706 with power.

The one or more data processors 746 of the one or more control units 740 are operably configured to collect and/or analyze the data collected by the one or more first and second sensors 738 and 744 in order to determine or characterize the kiss point for the clutch pack assemblies 602 of the drive unit assembly 600. As previously discussed, the kiss point is the point at which the one or more motors 706 begins to apply an amount of force onto the first and/or second plurality of clutch plates 660 and 662 of the one or more clutch pack assemblies 602 of the drive unit assembly 600. It is within the scope of this disclosure and as a non-limiting example that the one or more control units 740 may be operably configured to determine, set and/or update the kiss point for the drive unit assembly 600.

In accordance with the embodiment of the disclosure illustrated in FIG. 8 of the disclosure and as a non-limiting example, the one or more control units 740 may be in communication with a vehicle bus 748 via one or more control unit data-links 750. The one or more control unit data-links 750 allow for communication between the one or more control units 740 and the vehicle bus 750. Additionally, the one or more control unit data-links 750 allow for communication between the one or more first sensors 738 of the one or more motors 706 and the one or more control units 740 and the vehicle bus 748. As a non-limiting example the one or more control unit data-links 750 may be one or more fiber optic cables and/or one or more electrical cables that put the vehicle bus 748 in optical and/or electrical communication with the one or more control units 740, the one or more second sensors 744 of the one or more control units 740 and the one or more first sensors 738 of the one or more motors 706. It is within the scope of this disclosure and as a non-limiting example that the vehicle bus 748 may be a CAN Bus or a CAN Bus that conforms to the SAE J-1939 standards.

As illustrated in FIG. 8 of the disclosure and as a non-limiting example, the vehicle bus 748 may further include the use of one or more data processors 752 that are operably configured to collect and/or analyze the data collected from the one or more first and second sensors 738 and 744 in order to determine or characterize the kiss point for the one or more clutch pack assemblies 602 of the drive unit assembly 600. It is therefore within the scope of this disclosure and as a non-limiting example that the vehicle bus 748 may be operably configured to determine, set and/or update the kiss point for the drive unit assembly 600. As a result, it is within the scope of this disclosure and as a non-limiting example that the one or more control units 740 and/or the vehicle bus 748 may be used in order to determine, set and/or update the kiss point for the drive unit assembly 600.

While the embodiment of the disclosure illustrated in FIG. 8 illustrates the one or more motors 706 and the one or more first sensors 738 as being in electrical and/or optical communication with the one or more control units 740, it is within the scope of this disclosure that the one or more motors 706 and the one or more first sensors 738 may be in wireless communication with the one or more control units 740. As a non-limiting example the wireless communication between the one or more motors 706 and the one or more first sensors 738 and the one or more control units 740 may be a Bluetooth connection, a Wi-fi connection, a cellular connection and/or a radio wave connection. As a result, it is within the scope of this disclosure that the one or more motors 706, the one or more first sensors 738 and the one or more control units 740 may be operably configured to send and/or receive the data and/or instructions needed for the operation of the one or more clutch pack assemblies 602 of the drive unit 600. Additionally, it is therefore within the scope of this disclosure and as a non-limiting example that the one or more motors 706, the one or more first sensors 738 and the one or more control units 740 may be operably configured to send and/or receive the data and/or instructions needed in order to determine, set and/or update the kiss point of one or more of the one or more clutch pack assemblies 602 of the drive unit assembly 600.

Furthermore, while the embodiment of the disclosure illustrated in FIG. 8 illustrates the one or more control units 740 being in electrical and/or optical communication with the vehicle bus 748, it is within the scope of this disclosure that the one or more control units 740, the one or more motors 706, the one or more first sensors 738 and the one or more second sensors 744 may be wireless communication with the vehicle bus 748. As a non-limiting example the wireless communication between the one or more control units 740, the one or more motors 706, the one or more first sensors 738 and the one or more second sensors 744 and the vehicle bus 748 may be a Bluetooth connection, a Wi-fi connection, a cellular connection and/or a radio wave connection. As a result, it is within the scope of this disclosure that the one or more control units 740, the one or more motors 706, the one or more first sensors 738, the one or more second sensors 744 and/or the vehicle bus 748 may be operably configured to send and/or receive the data and/or instructions needed for the operation of the one or more clutch pack assemblies 602. Additionally, it is therefore within the scope of this disclosure and as a non-limiting example that the one or more control units 740 and/or the vehicle bus 748 may be operably configured to send and/or receive the data and/or instructions needed in order to determine, set and/or update the kiss point of one or more of the clutch pack assemblies 602 of the drive unit 600.

Figure 9:
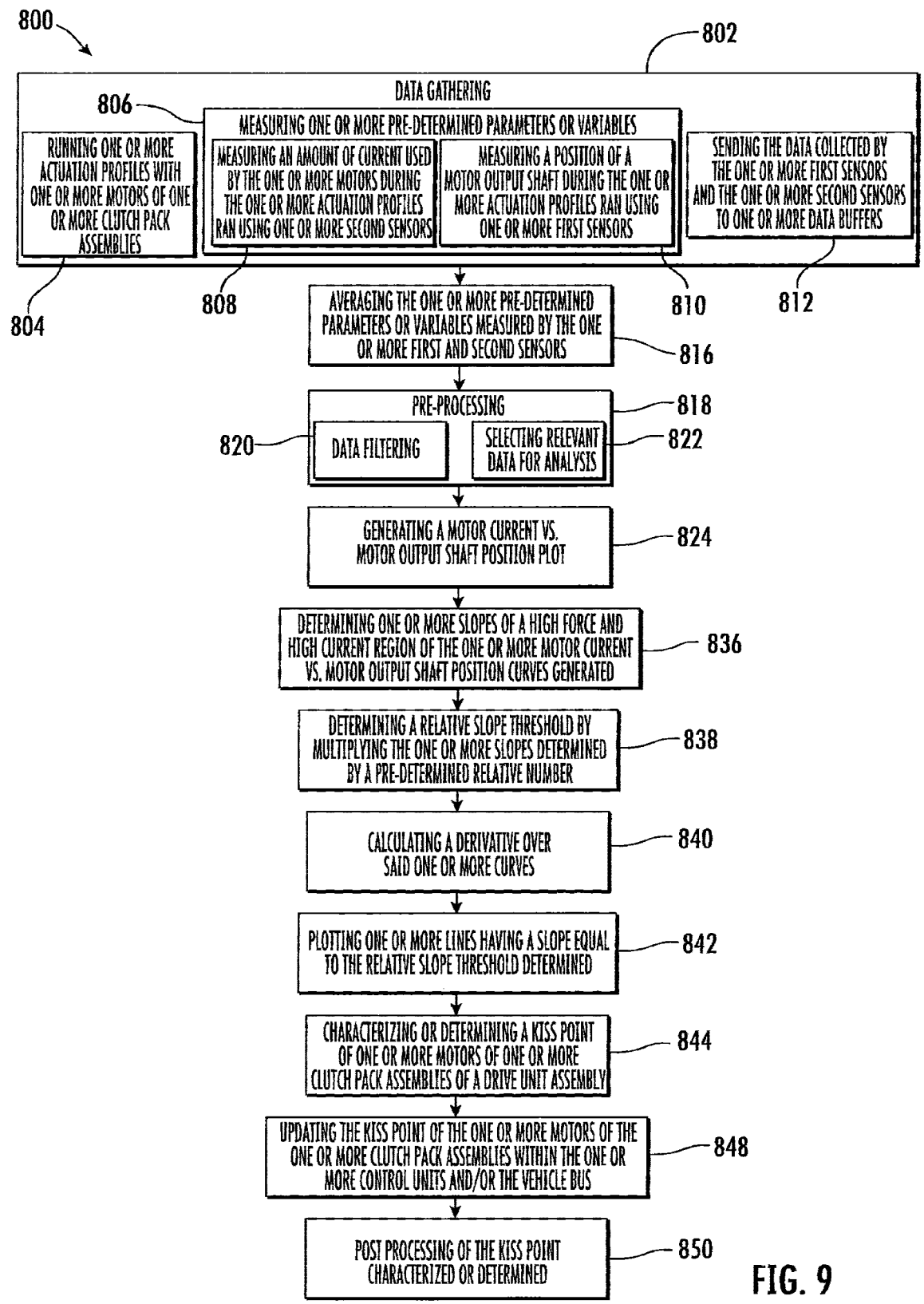
FIG. 9 is a flow chart illustrating a method of characterizing or determining a kiss point for one or more clutch pack assemblies of a drive unit assembly according to an embodiment of the disclosure.
Figure 10:
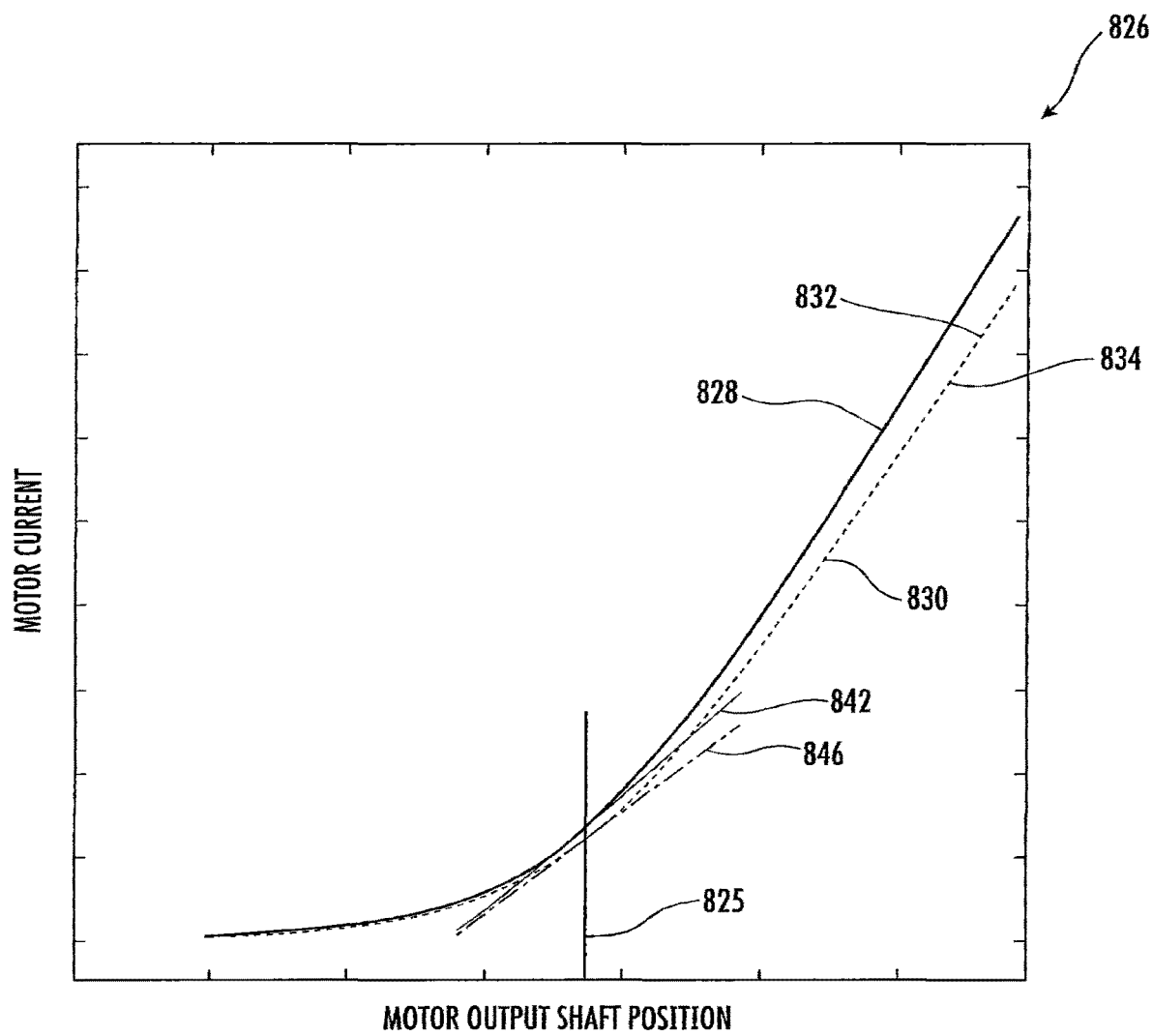
FIG. 10 is a graphical representation illustrating the method of characterizing or determining the kiss point for one or more clutch pack assemblies according to the embodiment of the disclosure illustrated in FIG. 9.

FIGS. 9 and 10 illustrate a method of characterizing or determining a kiss point 800 for the one or more clutch pack assemblies 602 of the drive unit assembly 600 according to an embodiment of the disclosure. As illustrated in FIG. 9 of the disclosure and as a non-limiting example, the first step of the method of characterizing or determining the kiss point 800 of the one or more clutch pack assemblies 602 of the drive unit assembly 60& includes a data gathering step 802. As part of the data gathering step 802, one or more actuation profiles 804 are ran by the one or more motors 706 of the one or more clutch pack assemblies 602 of the drive unit 600. During the running of the one or more actuation profiles 804, one or more cycles are ran by the one or more motors 706 to have the one or more force translational devices 685 apply a variable amount of force onto the first and second plurality of clutch plates 660 and 662 of the one or more clutch pack assemblies 602 of the drive unit assembly 600.

While the one or more actuation profiles 804 are ran, the one or more first sensors 738 and the one or more second sensors 744 measure one or more predetermined parameters or variables 806. As illustrated in FIG. 9 of the disclosure and as a non-limiting example, during the measuring of the one or more pre-determined parameters or variables 806 step of the method of determining the kiss point 800, the one or more second sensors 744 measure an amount of current being used by the one or more motors 706 while the one or more actuation profiles 804 are being ran.

Additionally, during the measuring of the one or more pre-determined parameters or variables 806 step, the one or more first sensors 738 measure a position of the motor output shaft 710 while the one or more actuation profiles 804 are being ran. It is within the scope of this disclosure and as a non-limiting example that the one or more first sensors 738 may measure the position of the motor output shaft 710 at pre-determined intervals during the running of the one or more actuation profiles 804. Additionally, it is within the scope of this disclosure and as a non-limiting example that the one or more first sensors 738 may measure the position of the motor output shaft 710 continuously throughout the running of the one or more actuation profiles 804 of the method of determining the kiss point 800 described herein.

Once the one or more pre-determined parameters or variables 806 are measured by the one or more first and second sensors 738 and 744, the one or more pre-determined parameters or variables 806 are sent 812 to one or more data buffers 814 in the one or more control units 740. The one or more data buffers 814 of the one or more control units 740 is a region of physical memory storage that is used to temporarily store the one or more pre-determined parameters or variables 806 during the data gathering step 802 while it is being transferred from one location to another within the one or more control units 740 and/or the vehicle bus 748.

According to an embodiment of the disclosure and as a non-limiting example, the method of characterizing or determining the kiss point 800 may further include the step of averaging 816 the one or more pre-determined parameters or variables measured 806 by the one or more first and second sensors 738 and 744. This will provide a mean value for the one or more pre-determined parameters measured 806 during the one or more actuation profiles 804 ran thereby providing an average profile for the one or more clutch pack assemblies 602 of the drive unit 600.

After the data gathering step 802 is completed, a pre-processing step 818 is performed. As illustrated in FIG. 9 of the disclosure and as a non-limiting example, the pre-processing step 818 includes a data filtering step 820 and a relevant data selection step 822. The data filtering step 820 is used to refine the one or more pre-determined parameters or variables measured 806 during the data gathering step 802. It is within the scope of this disclosure and as a non-limiting example that the data filtering step 820 excludes, removes and/or eliminates one or more of the one or more pre-determined parameters or variables measured 806 by the one or more first and second sensors 738 and 744 that are repetitive, irrelevant, too sensitive and/or considered to be noise. As a result, the data filtering step 820 aids in ensuring that a kiss point 825 characterized or determined according to the method of characterizing or determining a kiss point 800 described herein is as accurate as possible by excluding data that would otherwise adversely affect the kiss point 825 determined.

Once the data filtering step 820 is completed, the relevant data selection step 822 is performed. The relevant data selection step 822 selects a relevant selection of the one or more pre-determined parameters or variables measured 806 that will be used for analysis in the method of characterizing or determining a kiss point 800 described herein. In accordance with the embodiment of the disclosure illustrated in FIG. 9 and as a non-limiting example, the relevant data selection step 822 selects a portion of one or more pre-determined parameters or variables measures 806 by the none or more first and second sensors 738 and 744 where the current of the one or more motors 706 increases from a minimum value to a maximum value.

As illustrated in FIG. 9 of the disclosure and as a non-limiting example, once the pre-processing step 818 of the method of characterizing or determining a kiss point 800 is completed, a motor current vs. motor output shaft position plot is generated 824 in order to provide a force vs. position behavior for the one or more clutch pack assemblies 602 using the one or more motors 706. FIG. 10 of the disclosure provides a graphical representation of an exemplary motor current vs. motor output shaft position plot 826 generated in accordance with the method of characterizing or determining a kiss point 800 described herein. In accordance with the embodiment of the disclosure illustrated in FIG. 10 and as a non-limiting example, the relevant data selected 822 during the pre-processing step 818 generates one or more curves 828 for the one or more motors 706 and/or the one or more clutch pack assemblies 602 of the drive unit 600. As illustrated in FIG. 10 of the disclosure and as a non-limiting example, the one or more curves 828 includes a high force and high current region 832 that is substantially linear. The high force and high current region 832 of the one or more curves 828 is the portion of the one or more curves 828 with the steepest slope.

Additionally, in accordance with the embodiment of the disclosure illustrated in FIG. 10 and as a non-limiting example, the motor current vs. motor output shaft position plot 826 provides a graphical representation of one or more curves 830 for the drive unit assembly 600 using one or more motors "B" (not shown) and one or more control units "B" (not shown). The relevant motor current versus motor position data selected 822 provides a force versus position behavior for the one or more clutch pack assemblies 602 using the one or more motors "B" (not shown) and the one or more control units "B" (not shown). It is within the scope of this disclosure and as a non-limiting example that the one or more motors "B" may be an electric motor, an actuator, a linear actuator, a pneumatic actuator, a hydraulic actuator, an electromechanical actuator, an electro-magnetic actuator and/or any other type or motor that is able to convert an amount of energy into mechanical energy. As illustrated in FIG. 10 of the disclosure and as a non-limiting example, the one or more curves 830 includes a high force and high current region 834 that is substantially linear. The high force and high current region 834 of the one or more curves 830 is the portion of the one or more curves 830 with the steepest slope.

Once the step of generating the motor current vs. motor output shaft position plot 824 has been completed, one or more slopes 836 of the high force and high current regions 832 and/or 834 of the one or more curves 828 and/or 830 are determined. It is within the scope of this disclosure that the one or more slopes 836 of the high force and high current regions 832 and/or 834 of the one or more curves 828 and/or 830 may be determined over the length of the high force and high current regions 832 and/or 834. In accordance with this embodiment of the disclosure and as a non-limiting example, an average of the one or more slopes 836 determined over the length of the high force and high current regions 832 and/or 834 of the one or more curves 828 and/or 830 may be averaged together and used to determine the kiss point 825.

After the one or more slopes 836 of the high force and high current regions 832 and/or 834 of the one or more curves 828 and/or 830 have been determined, a relative slope threshold 838 is determined. The relative slope threshold 838 is determined multiplying the one or more slopes 836 with a pre-determined relative number (not shown). According to an embodiment of the disclosure and as a non-limiting example, the pre-determined relative number (not shown) may be a pre-determined percentage (xx %). It is within the scope of this disclosure and as a non-limiting example that the pre-determined percentage (xx %) may be determined offline by analyzing the data measured by the one or more first and/or second sensors 738 and/or 744. Various factors, such as but not limited to, the shape of the one or more curves 828 and/or 830 and the amount of "noise" related data on the one or more curves 828 and/or 830 can influence the pre-determined relative number (not shown) chosen for a given application. It is therefore to be understood that the relative slope threshold 838 is a percent (xx %) of the one or more slopes 836 of the high force and high current regions 832 and/or 834 of the one or more curves 828 and/or 830. According to an embodiment of the disclosure and as a non-limiting example, the pre-determined relative number (not shown) may be approximately 25% to approximately 45%, however it is within the scope of this disclosure that the pre-determined relative number (not shown) may be any percent (xx %) depending on the specific application.

As illustrated in FIG. 9 of the disclosure and as a non-limiting example, after the relative slope threshold 838 has been determined, a derivative calculation step 840 is performed. The derivative 840 calculated over the relevant data selected during the relevant data selection step 822 of the method of characterizing or determining a kiss point 800, over the entire region for the one or more curves 828 and/or 830. It is within the scope of this disclosure and as a non-limiting example that the derivative 840 used may be a smooth noise-robust numerical differentiation, a sgolay filter, a Savitzky-Golay filter and/or any other numerical or data smoothening process. The smooth noise-robust numerical differentiations, the sgolay filter and/or the Savitzky-Golay filter are used for the purpose of smoothening the one or more pre-determined parameters or variables measured 806 during the data gathering process 802. As a result, the method of characterizing or determining a kiss point 800 disclosed herein is more "noise robust" and therefore less susceptible to the measuring of what is considered to be "noise" data.

According to an alternative embodiment of the disclosure (not shown) and as a non-limiting example, the step of calculating the derivative 840 over the relevant data selected during the relevant data selection step 822 of the method of characterizing or determining a kiss point 800 may occur before the step of determining one or more slopes 836 of the high force and high current regions 832 and/or 834 of the one or more curves 828 and/or 830. In accordance with an alternative embodiment of the disclosure (not shown) and as a non-limiting example, the derivative calculation step 840 may occur before the step of determining one or more slopes 836 over the length of the high force and high current regions 832 and/or 834 of the one or more curves 828 and/or 830.

After the derivative calculation step 840 is completed, one or more lines are plotted 842. The one or more lines 842 plotted have a slope that is substantially equal to the relative slope threshold 838 determined for the one or more curves 828 of the motor current vs. motor output shaft position plot 826 generated. As illustrated in FIG. 10 of the disclosure and as a non-limiting example, the one or more lines 842 plotted are tangentially related to the one or more curves 828 of the motor current vs. motor output shaft position plot 826.

Once the one or more lines 842 having a slope that is substantially equal to the relative slope threshold 838 have been plotted, the kiss point 825 is characterized or determined 844. As previously discussed, the kiss point 825 is defined as the position of the motor output shaft 710 where the one or more force translational devices 685 apply an amount of force onto the first and/or second plurality of clutch plates 660 and 662 of the one or more clutch pack assemblies 602. As best seen in FIG. 10 of the disclosure and as a non-limiting example, the kiss point 825 for the one or more curves 828 of the motor current vs. motor output shaft position plot 826 is the point where the one or more lines 842 plotted intersects the one or more curves 828. It is therefore to be understood that the kiss point 825 for the one or more curves 828 is the point at which the derivative 840 of the relevant data selected 822 equals the slope of the one or more lines 842 of the motor current vs. motor output shaft position plots 826. As a result, the kiss point 825 is defined as a percent of the high force and high current region 832 of the one or more curves 828.

In accordance with the embodiment of the disclosure illustrated in FIG. 10 and as a non-limiting example, after the derivative calculation step 840 has been completed, one or more lines are plotted 846. The one or more lines 846 plotted have a slope that is substantially equal to the relative slope threshold 838 determined for the one or more curves 830 of the motor current vs. motor output shaft position plot 826 generated. As illustrated in FIG. 10 of the disclosure and as a non-limiting example, the one or more lines 846 plotted are tangentially related to the one or more curves 830 of the motor current vs. motor output shaft position plot 826.

Once the one or more lines 846 having a slope that is substantially equal to the relative slope threshold 838 have been plotted, the kiss point 825 is characterized or determined 844. The kiss point 825 for the one or more curves 830 is defined as the position of the motor output shaft (not shown) of the one or more motors "B" (not shown) where the one or more force translations devices 685 apply an amount of force onto the first and/or second plurality of clutch plates 660 and 662 of the one or more clutch assemblies 602. As best seen in FIG. 10 of the disclosure and as a non-limiting example, the kiss point 825 for the one or more curves 830 of the motor current vs. motor output shaft position plot 826 is the point where the one or more lines 846 plotted intersects the one or more curves 830. It is therefore to be understood that the kiss point 825 for the one or more curves 830 is the point at which the derivative 840 of the relevant data selected 822 equals the slope of the one or more lines 846 of the motor current vs. motor output shaft position plots 826. As a result, the kiss point 825 is defined as a percent of the high force and high current region 834 of the one or more curves 830.

As it can be seen by referencing FIG. 10 of the disclosure, the method of characterizing or determining a kiss point 800 described herein provides the same kiss point 825 no matter what type of motor or what type of control unit is used within the drive unit assembly 600 of the vehicle (not shown). As a result, the method of characterizing or determining a kiss point 800 described herein is more robust and therefore less susceptible to changes in the drive unit 600 such as, but not limited to, the type of motor(s) used, the performance of the motor(s) used, the type of control unit(s) used and the geometry of the one or more clutch pack assemblies used within the drive unit assembly 600. This makes the method of characterizing or determining a kiss point 800 easier, more accurate and more reliable than conventional methods. Additionally, the method of characterizing or determining a kiss point 800 described herein eliminates the need to use the specific parameters of the serviceable component(s) within the drive unit assembly 600 when characterizing or determining the kiss point 825. It is therefore to be understood that the method of characterizing or determining a kiss point 800 described herein eliminates the need to scan the barcode(s) of the serviceable component(s) within the drive unit assembly 600 in order to obtain the specific parameters for the serviceable component(s) being replaced or installed into the drive unit assembly 600. This will allow vehicle service personnel to use a wider array of serviceable components within the drive unit assembly 600 making the repair and/or replacement of the serviceable components of the drive unit assembly 600 quicker, easier and more cost efficient.

Once the kiss point has been characterized or determined 844, the kiss point 825 determined is updates 848 within the one or more control units 740 and/or the vehicle bus 748 of the vehicle (not shown). This will ensure that the one or more control units 740 and/or the vehicle bus 748 has the most up-to-date kiss point for the one or more motors 706 of the drive unit assembly 600. As illustrated in FIG. 9 of the disclosure and as a non-limiting example, a final post processing step 850 may be performed. In the final post processing step 850 the kiss point 825 determined is updated within the one or more control units 740 and/or the vehicle bus 748 of the vehicle (not shown) for the running and control of the one or more clutch pack assemblies 602 of the drive unit assembly 600 when in operation. This will provide the one or more control units 740 and/or the vehicle bus 748 with the precise position of the motor output shaft 710 needed to begin applying an amount of force onto the first and/or second plurality of clutch plates 660 and 662 of the one or more clutch pack assemblies 602. As a result, the method of characterizing or determining a kiss point 800 described herein allows the one or more controllers 740 and/or the vehicle bus 748 to more precisely and accurately control the amount of force that the one or more force translational devices 685 applies to the first and/or second plurality of clutch plates 660 and 662 of the one or more clutch pack assemblies 602.

In accordance with an embodiment of the disclosure and as a non-limiting example, the method of characterizing or determining a kiss point 800 described herein may be run at various pre-determined intervals 852 throughout the life of the drive unit assembly 600. This will allow the kiss point 825 for the one or more motors 706 to be periodically or continuously updated over the life of the drive unit assembly 600 to account for wear and tear within the various components of the drive unit assembly 600. As a result, the one or more control units 740 and/or the vehicle bus 748 will at all times be able to instruct the one or more motors 706 to apply the desired amount of force onto the first and/or second plurality of clutch plates 660 and 662 of the one or more clutch pack assemblies 602 no matter how much wear and tear is experienced by the components of the drive unit assembly 600.

It is within the scope of this disclosure that the various embodiments of the disclosure described and illustrated herein may be combined with one another to make a method of characterizing or determining a kiss point according to an embodiment of the disclosure. Additionally, it is within the scope of this disclosure that the various embodiments of the drive unit assembly described herein may be combined to provide a drive unit assembly incorporating the use of a method of characterizing or determining a kiss point according to an embodiment of the disclosure. In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

The invention claimed is:

1. A method for operating a clutch, comprising:
actuating the clutch with an actuator;
based on the actuating of the clutch, determining a reference position of the actuator at which a rate of change of positions of the actuator in relationship to electrical currents of the actuator is equal to a predetermined threshold; and
operating the clutch using the determined reference position as a position where force begins to be applied to the clutch.

2. The method of claim 1, further comprising translating the actuator between two or more positions, a first position of the actuator engaged with a clutch plate of the clutch, and wherein the actuator is mounted outboard of the clutch.

3. The method of claim 1, wherein the predetermined threshold is based on noise in the relationship of the positions of the actuator to the electrical currents of the actuator.

4. The method of claim 1, wherein the predetermined threshold is based on a shape of a curve representing the relationship of the positions of the actuator to the electrical currents of the actuator.

5. The method of claim 1, wherein the predetermined threshold is based on a fraction of the rate of change of the positions of the actuator in relationship to the electrical currents of the actuator.

6. The method of claim 1, wherein two actuators actuate the clutch, and
further comprising determining a reference position of a second actuator at which a rate of change of positions of the second actuator in relationship to second actuator electrical currents is equal to a second predetermined threshold.

7. The method of claim 1, wherein actuating the actuator follows a predetermined profile to generate the relationship between the plurality of actuator positions and the plurality of actuator electrical currents.

8. The method of claim 1, further comprising using sensors to gather the actuator positions and the actuator electrical currents.

9. The method of claim 1, where the determined reference position is a clutch kiss point where the actuator applies force to a clutch plate of the clutch.

10. A method for operating a clutch, comprising:
actuating the clutch between two or more positions using one or more actuators, a first position of the clutch transferring torque between two components, and a second position of the clutch separating the two components;
based on the actuating of the clutch, determining a reference position of a first actuator at which a rate of change of positions of the first actuator in relationship to electrical currents of the first actuator is equal to a first predetermined threshold;
based on the actuating of the clutch, determining a reference position of a second actuator at which a rate of change of positions of the second actuator in relationship to electrical currents of the second actuator is equal to a second predetermined threshold; and
determining a clutch kiss point based on the reference positions of the first actuator and the second actuator.

11. The method of claim 10, wherein the clutch is actuated according to a predetermined profile, and at least one of the one or more actuators is a linear actuator.

12. The method of claim 10, wherein sensors measure positions of the first actuator and the second actuator and electrical currents of the first actuator and the second actuator.

13. The method of claim 10, wherein the rate of change of positions of the first actuator in relationship to electrical currents of the first actuator and the rate of change of positions of the second actuator in relationship to electrical currents of the second actuator are determined using derivatives.

14. The method of claim 10, further comprising determining first slopes of the relationship between positions of the first actuator and the electrical currents of the first actuator, and determining second slopes of the relationship between positions of the second actuator and the electrical currents of the second actuator.

15. The method of claim 14, further comprising translating the one or more actuators between two or more positions, a first position of the actuator engaged with a clutch plate of the clutch, and
wherein the one or more actuators are mounted outboard of the clutch.

16. A system comprising:
an actuator translatable to actuate a clutch between two or more positions, the actuator engaging a clutch plate of the clutch;
the clutch translatable between the two or more positions, a first position of the clutch transferring torque between two components, a second position of the clutch disconnecting the two components;
a controller comprising memory and instructions configured to:
actuate the clutch,
based on the actuating of the clutch, determine a reference position of the actuator at which a rate of change of positions of the actuator in relationship to electrical currents of the actuator is equal to a predetermined threshold; and
operate the clutch using the determined reference position as a position where force begins to be applied to the clutch.

17. The system of claim 16, wherein the clutch transfers torque in a tandem axle assembly.

18. The system of claim 17, further comprising the controller configured to:
actuate the clutch with a second actuator,
based on the actuating of the clutch with the second actuator, determine a reference position of the second actuator at which a rate of change of positions of the second actuator in relationship to electrical currents of the second actuator is equal to a second predetermined threshold.

19. The system of claim 16, wherein the first position of the clutch transferring torque between a differential assembly and an axle, and the second position disconnecting the differential assembly and the axle.

20. The system of claim 16, wherein the clutch is positioned between a differential assembly and an axle which drives one or more wheels, and
the actuator is mounted outboard of the clutch.

* * * * *